(12) United States Patent
Watfa et al.

(10) Patent No.: US 11,877,151 B2
(45) Date of Patent: *Jan. 16, 2024

(54) METHODS FOR SERVICE SLICE SELECTION AND SEPARATION

(71) Applicant: InterDigital Patent Holdings, Inc., Wilmington, DE (US)

(72) Inventors: Mahmoud Watfa, Saint Leonard (CA); Behrouz Aghili, Commack, NY (US); Saad Ahmad, Montreal (CA); Ulises Olvera-Hernandez, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,573

(22) Filed: Apr. 28, 2022

(65) Prior Publication Data

US 2022/0256342 A1 Aug. 11, 2022

Related U.S. Application Data

(63) Continuation of application No. 16/089,883, filed as application No. PCT/US2017/025603 on Mar. 31, 2017, now Pat. No. 11,350,274.

(Continued)

(51) Int. Cl.
*H04L 9/40* (2022.01)
*H04L 41/0893* (2022.01)
(Continued)

(52) U.S. Cl.
CPC ......... *H04W 12/06* (2013.01); *H04L 63/0876* (2013.01); *H04W 4/18* (2013.01);
(Continued)

(58) Field of Classification Search
CPC ......... H04W 12/06; H04W 4/18; H04W 8/02; H04W 8/08; H04W 16/02; H04W 60/00;
(Continued)

(56) References Cited

U.S. PATENT DOCUMENTS 8,532,614 B2 9/2013 Somasundaram et al.
8,699,711 B2 4/2014 Mukherjee et al.
(Continued)

FOREIGN PATENT DOCUMENTS

CN 103237342 A 8/2013
CN 106210042 A 12/2016
(Continued)

OTHER PUBLICATIONS

Network Store: Exploring Slicing in Future 5G Networks, by Braun et al., published 2015 (Year: 2015).*

(Continued)

*Primary Examiner* — Vu V Tran
(74) *Attorney, Agent, or Firm* — Flaster Greenberg PC

(57) ABSTRACT

Embodiments include methods and apparatuses for providing access to a network slice in a communication system. In an embodiment, a network server that implements a Control Plane (CP) Network Function (NF) may receive a Non-Access Stratum (NAS) message from a wireless transmit and receive unit (WTRU). The NAS message comprises a Mobility Management (MM) message for registration and a Session Management (SM) messages for a specific service provided by the network slice. After selecting the network slice, the network server may transmit the SM message to another CP NF in the network slice to establish a communication link between the WTRU and the network slice.

20 Claims, 14 Drawing Sheets

Related U.S. Application Data

(60) Provisional application No. 62/337,085, filed on May 16, 2016, provisional application No. 62/317,167, filed on Apr. 1, 2016.

(51) Int. Cl.

| | | |
|---|---|---|
| *H04W 8/08* | (2009.01) | |
| *H04W 48/18* | (2009.01) | |
| *H04W 76/10* | (2018.01) | |
| *H04W 12/06* | (2021.01) | |
| *H04W 8/02* | (2009.01) | |
| *H04W 16/02* | (2009.01) | |
| *H04W 4/18* | (2009.01) | |
| *H04W 60/00* | (2009.01) | |
| *H04W 88/14* | (2009.01) | |

(52) U.S. Cl.
CPC .............. *H04W 8/02* (2013.01); *H04W 16/02* (2013.01); *H04W 60/00* (2013.01); *H04W 88/14* (2013.01)

(58) Field of Classification Search
CPC ..... H04W 88/14; H04W 48/18; H04W 76/10; H04L 63/0876; H04L 41/0893
See application file for complete search history.

(56) References Cited

U.S. PATENT DOCUMENTS

| | | | |
|---|---|---|---|
| 9,462,477 | B2 | 10/2016 | Ahmad et al. |
| 9,532,185 | B2 | 12/2016 | Amerga et al. |
| 9,693,381 | B2 | 6/2017 | Jamadagni et al. |
| 2013/0201830 | A1 | 8/2013 | Wang et al. |
| 2014/0086177 | A1 | 3/2014 | Adjakple |
| 2014/0226531 | A1 | 8/2014 | Farkas et al. |
| 2014/0241333 | A1 | 8/2014 | Kim |
| 2015/0296321 | A1 | 10/2015 | Kim et al. |
| 2016/0135063 | A1 | 5/2016 | Ham |
| 2016/0219503 | A1 | 7/2016 | Kim et al. |
| 2016/0353465 | A1* | 12/2016 | Vrzic .................. H04L 41/5054 |
| 2017/0079059 | A1* | 3/2017 | Li .......................... H04W 16/02 |
| 2017/0142591 | A1* | 5/2017 | Vrzic .................... H04W 24/02 |
| 2017/0245316 | A1 | 8/2017 | Salkintzis |
| 2017/0311304 | A1 | 10/2017 | Lu |
| 2018/0124854 | A1* | 5/2018 | Myhre .................. H04W 76/10 |
| 2018/0242161 | A1 | 8/2018 | Vulgarakis Feljan |
| 2018/0249317 | A1 | 8/2018 | Kurasugi |
| 2018/0295556 | A1 | 10/2018 | Baek |
| 2018/0352501 | A1 | 12/2018 | Zhang |
| 2018/0376414 | A1 | 12/2018 | Zeng |
| 2019/0045351 | A1 | 2/2019 | Zee |
| 2019/0174498 | A1* | 6/2019 | Samdanis ......... H04W 72/0453 |
| 2020/0275356 | A1* | 8/2020 | Forsman ............. H04L 41/0895 |

FOREIGN PATENT DOCUMENTS

| | | |
|---|---|---|
| JP | 2014045390 A | 3/2014 |
| WO | WO 2008/113775 A2 | 9/2008 |
| WO | WO 2012/108717 A2 | 8/2012 |
| WO | WO 2014/069928 A1 | 5/2014 |
| WO | WO 2014173426 A1 | 10/2014 |
| WO | WO 2015/037882 A1 | 3/2015 |
| WO | WO 2016162467 A1 | 10/2016 |
| WO | WO 2016162480 A1 | 10/2016 |

OTHER PUBLICATIONS

Shimojo et al., "Future Mobile Core Network for Efficient Service Operation," Proceedings of the 2015 1st IEEE Conference on Network Softwarization (NetSoft) (Apr. 17, 2015).

El Hattachi et al., "NGMN 5G White Paper," Version 1.0 (Feb. 2015).

Ericsson, "Multiple network slices per UE," SA WG2 Meeting #113AH, S2-161342, Sophia Antipolis, France (Feb. 23-26, 2016).

Huawei et al., "Solutions for key issue 1—Support of Network Slicing," SA WG2 Meeting #113AH, S2-161327, Sophia Antipolis, France (Feb. 23-26, 2016).

Interdigital, "Distribution of NFs across Network Slices," SA WG2 Meeting #114, S2-161807, Sophia Antipolis, France (Apr. 11-15, 2016).

LG Electronics, "Solution on Key issue #1: Support of multiple sessions via multiple Core Network Slices Instance," SA WG2 Meeting #114, S2-161541, Sophia Antipolis, France (Apr. 11-15, 2016).

Li et al., "Toward Software-Defined Cellular Networks," European Workshop on Software Defined Networking, pp. 7-12 (Oct. 2012).

Liang et al., "Information-Centric Network Function Virtualization over 5G Mobile Wireless Networks," IEEE Network, vol. 27, No. 3, pp. 68-74 (Jun. 2015).

Nokia Networks et al., "Solution: Network Slicing," SA WG2 Meeting #S2-113ah, S2-161326, Sophia Antipolis, France (Feb. 23-26, 2016).

NTT DoCoMo, "Solution to support a UE with simultaneous connections to multiple Network Slices," SA WG2 Meeting #113AH, S2-161328, Sophia Antipolis, France (Feb. 23-26, 2016).

Shimojo et al., "Future Core Network for the 5G Era," NTT DoCoMo Technical Journal vol. 17, No. 4, pp. 50-59 (Apr. 2016).

Third Generation Partnership Project, "Technical Specification Group Services and System Aspects; System Architecture for the 5G System; Stage 2 (Release 15)," 3GPP TS 23.501 V0.3.1 (Mar. 2017).

Third Generation Partnership Project, "Technical Specification Group Services and System Aspects; Study on Architecture for Next Generation System (Release 14)," 3GPP TR 23.799 V0.3.0 (Mar. 2016).

Third Generation Partnership Project, "Technical Specification Group Services and System Aspects; Study on Architecture for Next Generation System (Release 14)," 3GPP TR 23.799 V14.0.0 (Dec. 2016).

Third Generation Partnership Project, "Technical Specification Group Services and System Aspects; Feasibility Study on New Services and Markets Technology Enablers; Stage 1 (Release 14)," 3GPP TR 22.891 V14.0.0 (Mar. 2016).

Third Generation Partnership Project, "Technical Specification Group Services and System Aspects; Feasibility Study on New Services and Markets Technology Enablers; Stage 1 (Release 14)," 3GPP TR 22.891 V14.2.0 (Sep. 2016).

ZTE, "NextGen Core Architecture solution for sharing Network Function across multiple Network Slices," SA WG2 Meeting #114, S2-16xxxx (S2-161418), Sophia Antipolis, France (Apr. 11-15, 2016).

S2-160980, "Architectural requirements, assumptions and principles impact on key issue descriptions", 3rd Partnership Project (3GPP); SA WG2 Meeting #113AH, Sophia Antipolis, France, Feb. 23-26, 2016, 8 pages.

* cited by examiner

METHODS FOR SERVICE SLICE SELECTION AND SEPARATION

CROSS REFERENCE TO RELATED APPLICATIONS

This application is a continuation of U.S. patent application Ser. No. 16/089,883, filed Sep. 28, 2018, which is the U.S. National Stage, under 35 U.S.C. § 371, of International Application No. PCT/US2017/025603 filed Mar. 31, 2017, which claims the benefit of U.S. Provisional Application No. 62/317,167, filed on Apr. 1, 2016, and U.S. Provisional Application No. 62/337,085, filed on May 16, 2016. The entirety of U.S. patent application Ser. No. 16/089,883 is incorporated herein by reference. The entirety of International Application No. PCT/US2017/025603 is incorporated herein by reference. The entirety of U.S. Provisional Application No. 62/317,167 is incorporated herein by reference. The entirety of U.S. Provisional Application No. 62/337,085 is incorporated herein by reference.

BACKGROUND

Studies by the 3rd Generation Partnership Project (3GPP) on the development of a fifth generation (5G) wireless communication system have shown network slicing to be an important feature of the 5G systems and an enabler for providing different services and meeting different service requirements. Network slicing may be performed by grouping different network entities into a logical network, such as shared network functions and dedicated network functions, which may be logically or physically isolated from each other. For example, a network slice may include a logical connection of shared network functions residing in various nodes of a wireless communication system and may allow a user to obtain dedicated services or network capacity on a per service basis. Thus, it would be desirable to have a method and apparatus configured to support these network functions using network slicing.

SUMMARY

In an embodiment, a method for providing access to a network slice in wireless communications is disclosed. The method may include: receiving, at a shared Control Plane (CP) Network Function (NF), a Non-Access Stratum (NAS) message that comprises a Mobility Management (MM) message and a Session Management (SM) message; and transmitting, to a non-shared CP NF in the network slice, the SM message that indicates a User Plane (UP) service provided by the network slice.

In another embodiment, a network server configured to implement a shared Control Plane (CP) Network Function (NF) for providing access to a network slice in wireless communications is disclosed. The network server may include: a processor configured to receive, at the shared CP NF, a Non-Access Stratum (NAS) message that comprises a Mobility Management (MM) message and a Session Management (SM) message; and transmit, to a non-shared CP NF in the network slice, the SM message that indicates a User Plane (UP) service provided by the network slice.

BRIEF DESCRIPTION OF THE DRAWINGS

A more detailed understanding may be had from the following description, given by way of example in conjunction with the accompanying drawings wherein.

DETAILED DESCRIPTION

Figure 1A:
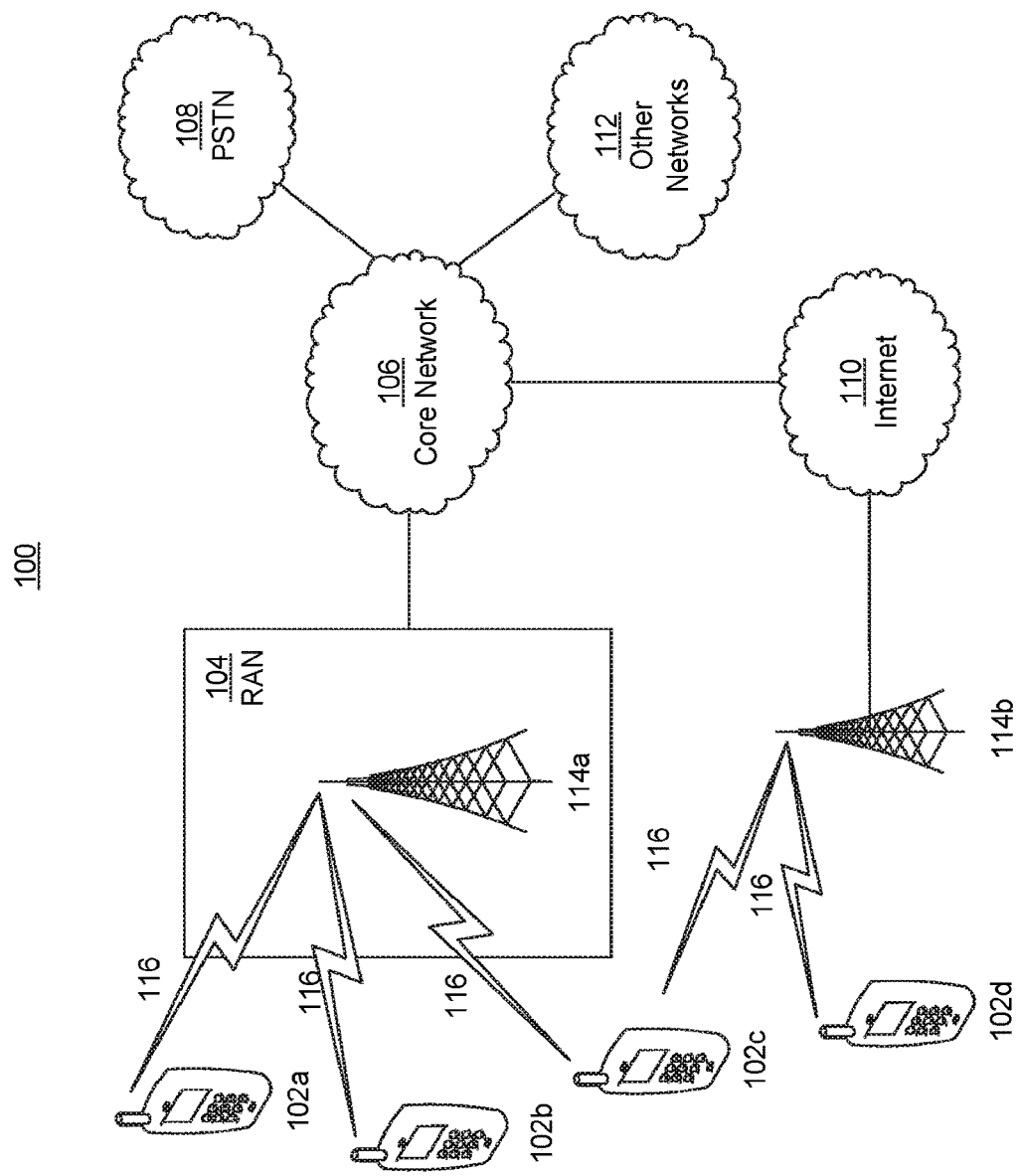
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a. 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a. 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a. 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
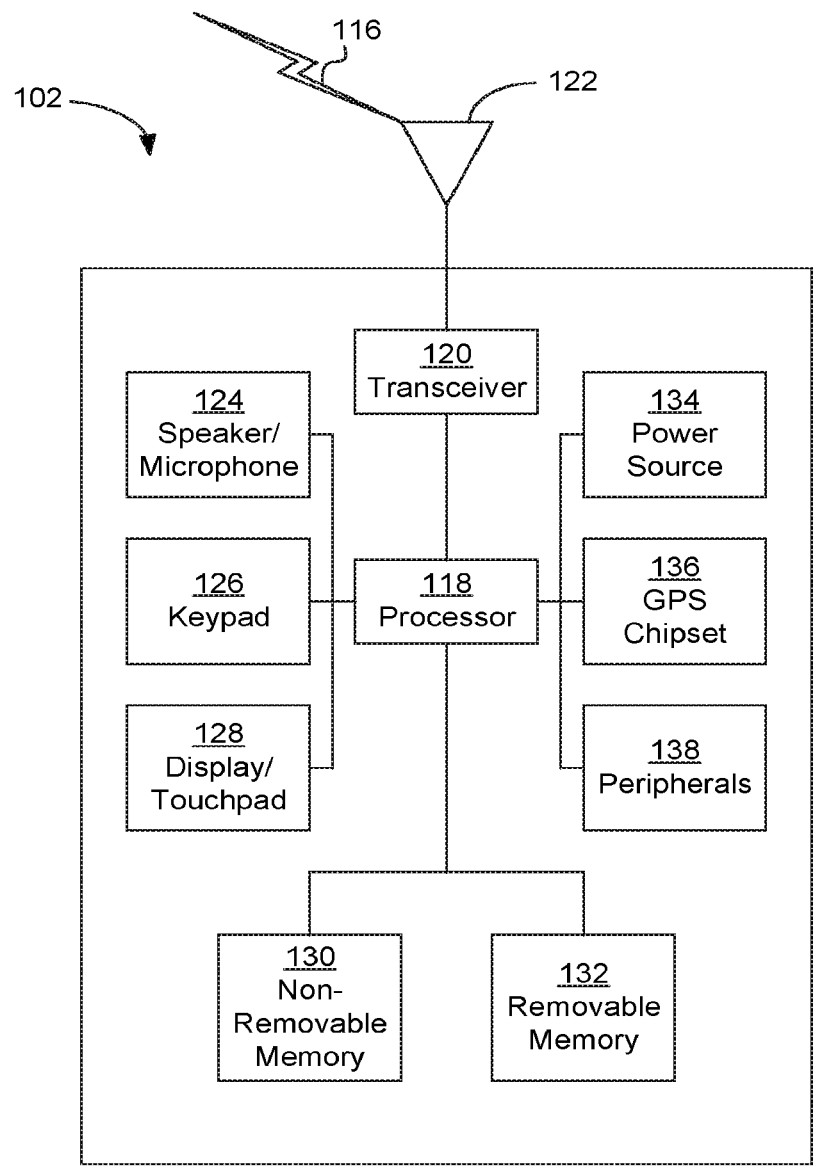
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a. 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
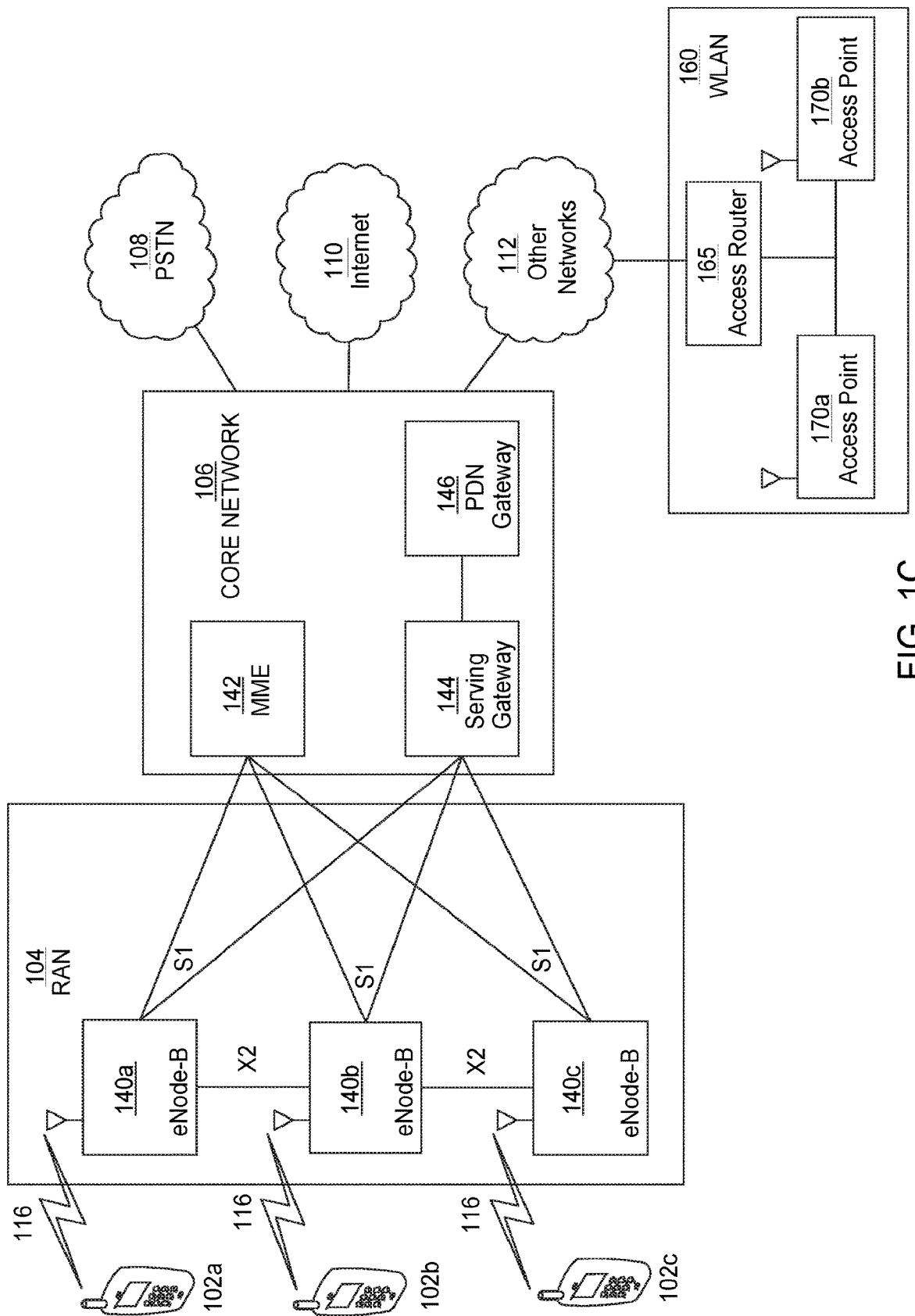
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Figure 2A:
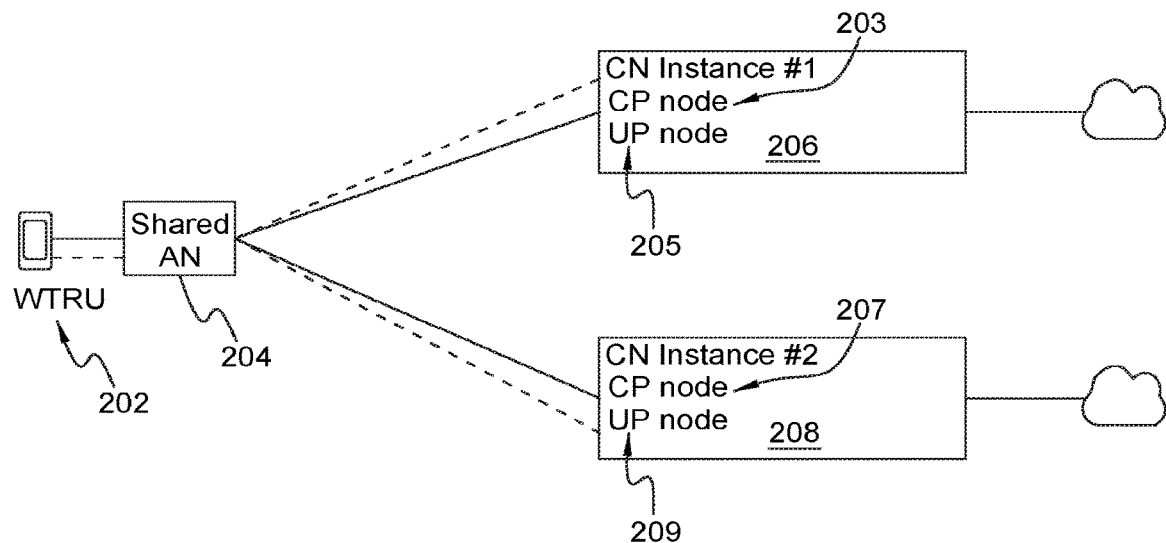
FIG. 2A is a diagram illustrating network slice instances that are grouped by independent Control Plane (CP) and User Plane (UP) nodes per network slices.
Figure 2B:
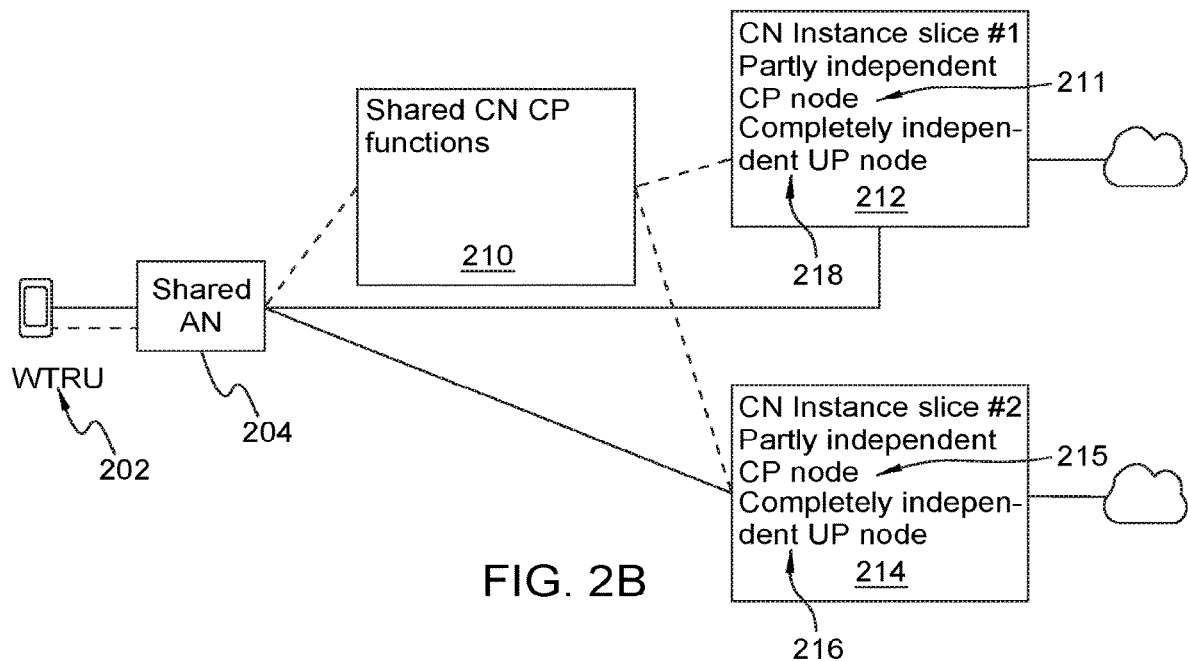
FIG. 2B is a diagram illustrating network slice instances that are grouped by shared Control Plane (CP) nodes and partly independent Control Plane (CP) and completely independent User Plane (UP) nodes per network slices.
Figure 2C:
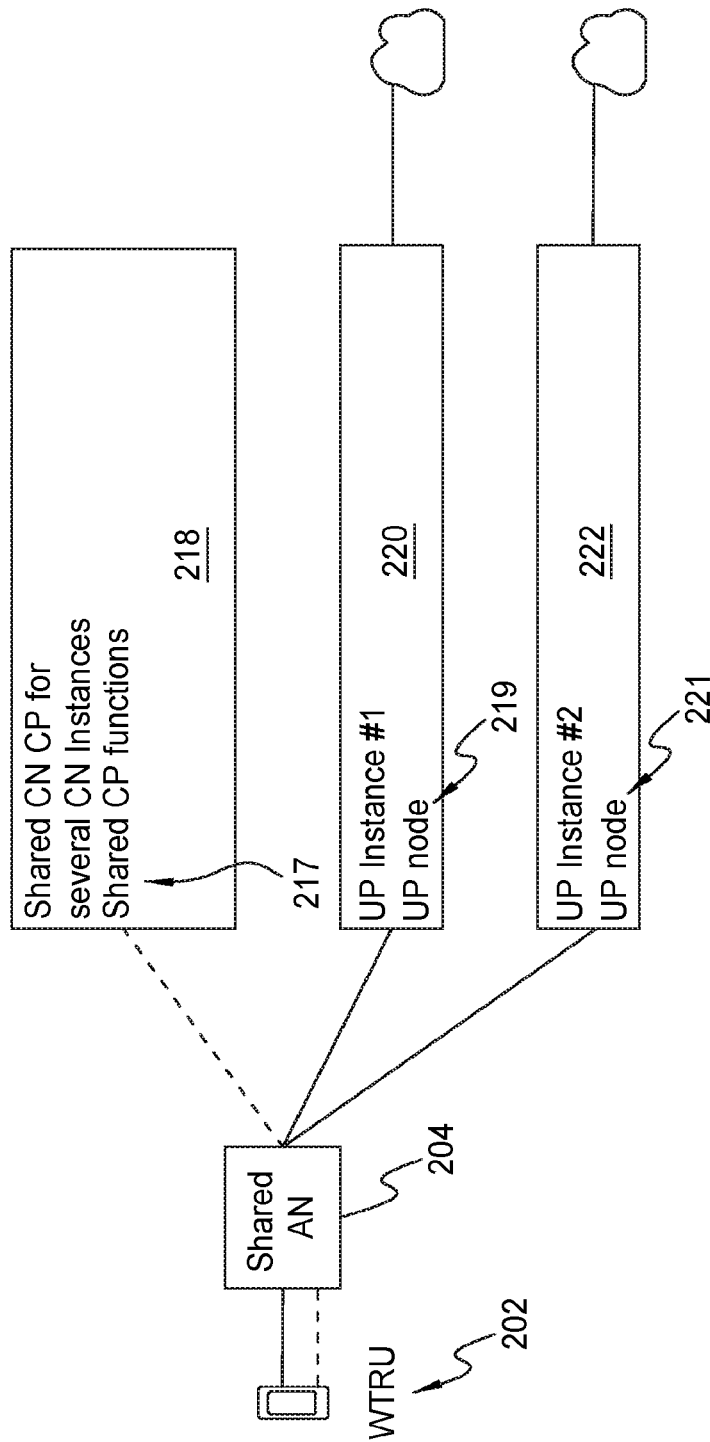
FIG. 2C is a diagram illustrating network slice instances that are grouped by shared Control Plane (CP) and independent User Plane (UP) nodes per network slices.

Referring now to FIGS. 2A, 2B, and 2C, network slice instances 206, 208, 210, 212, 214, 218, 220, 222 which are grouped by control plane (CP) and user plane (UP) nodes per network slice are shown. A network slice may have independent CP 203, 207 and UP nodes 205, 209 as shown in FIG. 2A. Specifically, the CN Instance #1 206 may include a CP node 203 and a UP node 205 inside the network slice of CN Instance #1 206. Similarly, the CN Instance #2 208 may include a CP node 207 and a UP node 209 inside the network slice of CN Instance #2 208. The CP nodes 203, 207 in the CN Instance #1 206 and the CN Instance #2 208 respectively may receive control plane signaling messages from a WTRU 202. The UP nodes 205, 209 in the CN Instance #1 206 and the CN Instance #2 208 respectively may receive user plane data from the WTRU 202. For example, the WTRU 202 may transmit registration and authentication requests to the CP node 203 of CN Instance #1 206. The WTRU 202 may also transmit data packets to the UP node 205 of CN Instance #1 206. Similarly, the WTRU 202 may transmit its mobility management message to the CP node 207 of CN Instance #2 208 and its session management message to the UP node 209 of CN Instance #2 208. The WTRU 202 may be connected to the CN Instance #1 206 and CN Instance #2 208 via the Shared Access Network (AN) 204.

Referring now to FIG. 2B, a diagram of an embodiment where a network slice may share a CP node 210 but have partly independent CP 211, 215 and completely independent UP nodes 218, 216 per network slices is shown. Specifically, the CN Instance slice #1 212 or CN Instance slice #2 214 may share the shared core network (CN) control plane (CP) functions. The CN Instance slice #1 212 may include a partly independent CP node 211 and a completely independent UP node 218. The CN Instance slice #2 214 may include a partly independent CP node 215 and a completely independent UP node 216. The shared CN CP functions 210 may perform common network functions for the CN Instance slice #1 212 and CN Instance slice #2 214. Such common network functions may include authentication, mobility management, session management, gateway function, and the like.

The partly independent CP nodes 211, 215 may perform slice specific control plane network functions. The completely independent UP nodes 213, 216 may also perform slice specific user plane network functions. The WTRU 202 may be connected to the CN Instance slice #1 212 or CN Instance slice #2 214 without the shared CN CP functions 210 for a slice specific network function. Such a slice specific network function may include non-shared session management functions.

Referring now to FIG. 2C, a diagram of an embodiment where a network slice may share control plane (CP) functions 217 in a shared CN CP node 218 and have independent user plane (UP) nodes 219, 221 per network slices is shown. The shared CN CP node 218 may perform shared control plane functions 217 for several core network instances such as the UP Instance #1 220 and UP Instance #2 222. The UP Instance #1 220 and UP Instance #2 222 may include independent UP nodes 219, 221, respectively. The Shared CN CP 218, UP Instance #1 220, and UP Instance #2 222 may be connected to the WTRU 202 via the shared access network (AN) 204. The UP Instance #1 220 and UP Instance #2 222 may have the shared CN CP node 218 for the control plane functionalities. The shared CN CP functions 217 may perform common control plane functions for the UP Instance #1 220 and UP Instance #2 222. The common control plane functions performed by the shared CP functions 217 may include authentication, mobility management, gateway function, and the like. The UP nodes 219 and 221 in the UP Instance #1 220 and UP Instance #2 222 may perform slice specific user plane network functions such as non-shared session management functions.

Figure 3:
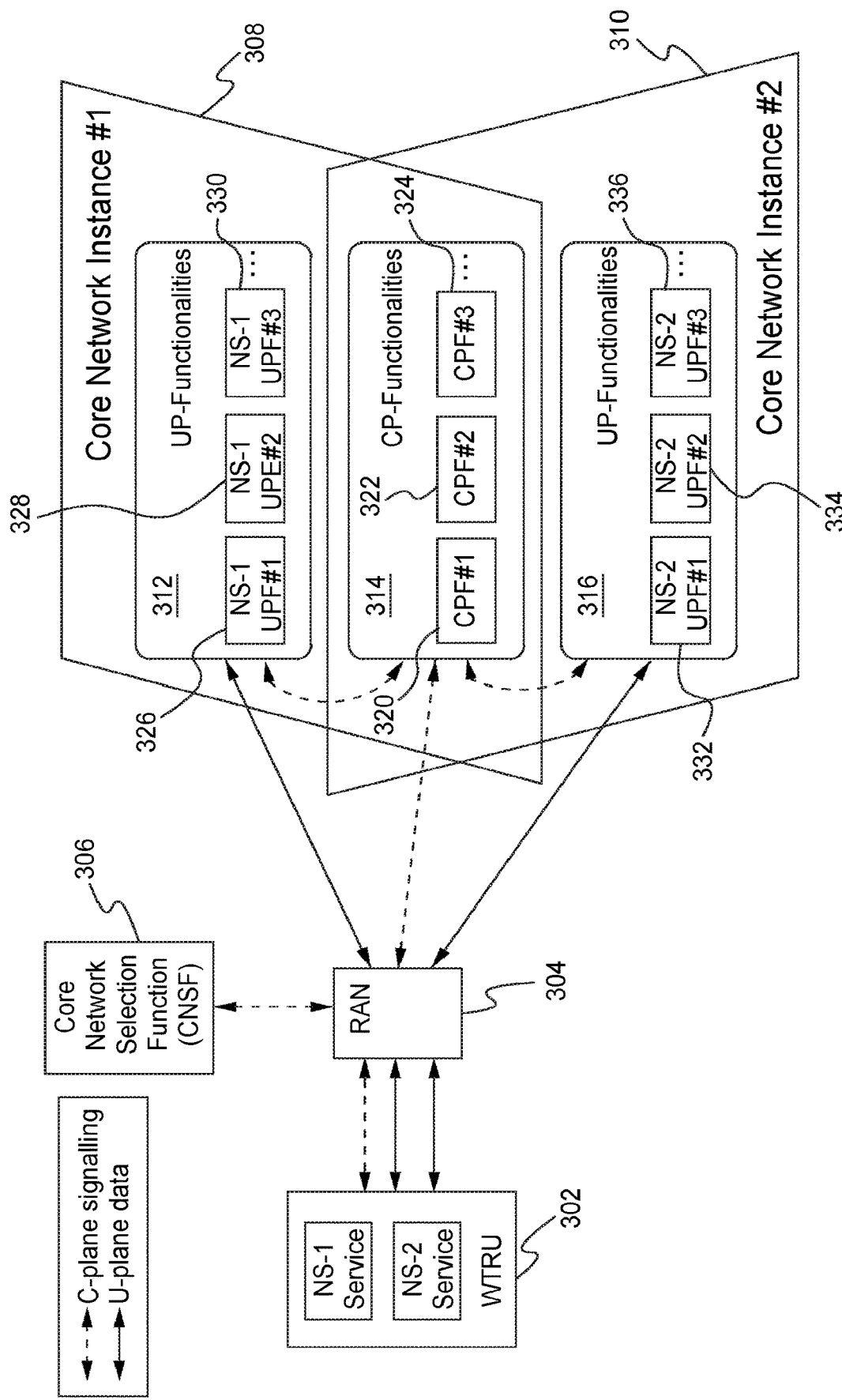
FIG. 3 is a diagram illustrating an example network slicing that includes a shared CP node and independent UP nodes.

Referring now to FIG. 3, an example network slicing that includes shared CP functionalities 314 and independent UP functionalities 312, 316 is shown. The network slicing in FIG. 3 may be modeled towards the network slice instances shown in FIG. 2C. The shared CP functionalities 314 and independent UP functionalities 312 may form a network slice (i.e. Core Network Instance #1 308). Similarly, the shared CP functionalities 314 and independent UP functionalities 316 may form another network slice (i.e. Core Network Instance #2 310).

As shown in FIG. 3, the Core Network Instance #1 308 may include a single set of control plane functionalities 314

(C-Plane functions) and a single set of user plane functionalities 312 (U-Plane functions). The single set of control plane functionalities 314 may include multiple functions such as CPF #1 320, CPF #2 322, and CPF #3 324 for the common network functions. Such common network functions may include authentication, mobility management, session management, gateway function, and the like. The single set of user plane functionalities 312 may include multiple functions such as NS-1 UPF #1 326, NS-1 UPF #2 328, and NS-1 UPF #3 330 for the slice specific user plane network functions. Similarly, the Core Network Instance #2 310 may include a single set of control plane functionalities 314 and a single set of user plane functionalities 316. The single set of user plane functionalities 316 may include multiple functions such as NS-2 UPF #1 332, NS-2 UPF #2 334, and NS-2 UPF #3 336 for the slice specific user plane network functions.

In an embodiment, the Core Network Instance #1 308 or Core Network Instance #2 310 may be a dedicated network slice for the WTRU 302 depending on the type of WTRU 302. The type of WTRU 302 may be identified by using specific parameters such as WTRU 302 usage type, WTRU's 302 subscription information, and the like.

A set of C-Plane functions, CPF #1 320, CPF #2 322, and CPF #3 324, may be responsible for supporting mobility of the WTRU 302 if the mobility management is demanded by the WTRU 302. In addition, the CPF #1 320, CPF #2 322, and CPF #3 324 may be responsible for admitting the WTRU 302 into the network by performing authentication and subscription verification. For example, the CPF #1 320 in the CP Functionalities 314 may provide mobility management to the WTRU 302 for the Core Network Instance #1 308. At the same time, the CPF #1 in the CP Functionalities 314 may provide another mobility management to the WTRU 302 for the Core Network Instance #2 310. Similarly, the CPF #2 322 in the CP Functionalities 314 may authenticate the WTRU 302 for the Core Network Instance #1 308. The CPF #2 322 in the CP Functionalities 314 may also authenticate the WTRU 302 for the Core Network Instance #2 310.

A set of U-Plane functions (i.e. NS-1 UPF #1 326, NS-1 UPF #2 328, NS-1 UPF #3 330 in the Core Network Instance #1 308, and NS-2 UPF #1 332, NS-2 UPF #2 334, NS-2 UPF #3 336 in the Core Network Instance #2) may be responsible for providing a specific service to the WTRU 302. The set of U-Plane functions above may also responsible for transporting U-Plane data of the specific service to the WTRU 302. For example, the NS-1 UPS #1 326 in the Core Network Instance #1 308 may provide an enhanced mobile broadband service to the WTRU 302, whereas the NS-2 UPF #2 334 in the Core Network Instance #2 310 may provide a critical communication service to the WTRU 302.

When the WTRU 302 first connects to an operator's network through the RAN 304, a default core network instance that matches to the WTRU 302 usage type may be assigned to the WTRU 302. The assigned default core network instance may be the Core Network Instance #1 or Core Network Instance #2 depending on the WTRU 302 usage type. The WTRU 302 may have multiple U-Plane connections to different sets of U-Plane functions that are available at different core network instances simultaneously. This means that the WTRU 302 may be connected to user plane functions NS-1 UPF #1 326, NS-1 UPF #2 328, NS-1 UPF #3 330 in the UP Functionalities 312, and at the same time, the WTRU 302 may be connected to another user plane functions NS-2 UPF #1 332, NS-2 UPF #2 334, NS-2 UPF #3 336 in the UP Functionalities 316. Although it is not shown in FIG. 3, the connection to user plane functions may not be limited to the UP Functionalities 312 and UP Functionalities 316. The WTRU 302 may have multiple user plane connections to different user plane functions in core network instances other than the Core Network Instance #1 and Core Network Instance #2.

The Core Network Selection Function (CNSF) 306 may be responsible for selecting a core network instance among the Core Network Instance #1 and Core Network Instance #2. The CNSF 306 may determine the core network slice selection based on WTRU's 302 subscription and specific parameters such as WTRU 302 usage types. The CNSF 306 may also be responsible for selecting control plane functions within the selected core network instance that a base station may communicate with. For example, the CNSF 306 may select CPF #2 322 and CPF #3 324 in the Core Network Instance #1 308 to communicate with a base station. The selection of control plane functions may be done by using specific parameters such as WTRU 302 usage types. The CNSF 306 may be responsible for selecting a set of user plane functions that a base station may establish in the connection for transporting user plane data of different services. For example, the CNSF 306 may select NS-1 UPF #2 328 in the Core Network Instance #1 308 to transport user plane data of an enhanced mobile broadband service. The selection of user plane functions among NS-1 UPF #1 326, NS-1 UPF #2 328, NS-1 UPF #3 330, NS-2 UPF #1 332, NS-2 UPF #2 334, and NS-2 UPF #3 336 may be done by using specific parameters such as WTRU 302 usage types, service types and the like. Although it is not shown in FIG. 3, the selection of user plane functions may not be limited to the Core Network Instance #1 and Core Network Instance #2 and the CNSF 306 may select other user functions located in core network instances other than Core Network Instance #1 and Core Network Instance #2.

Figure 4:
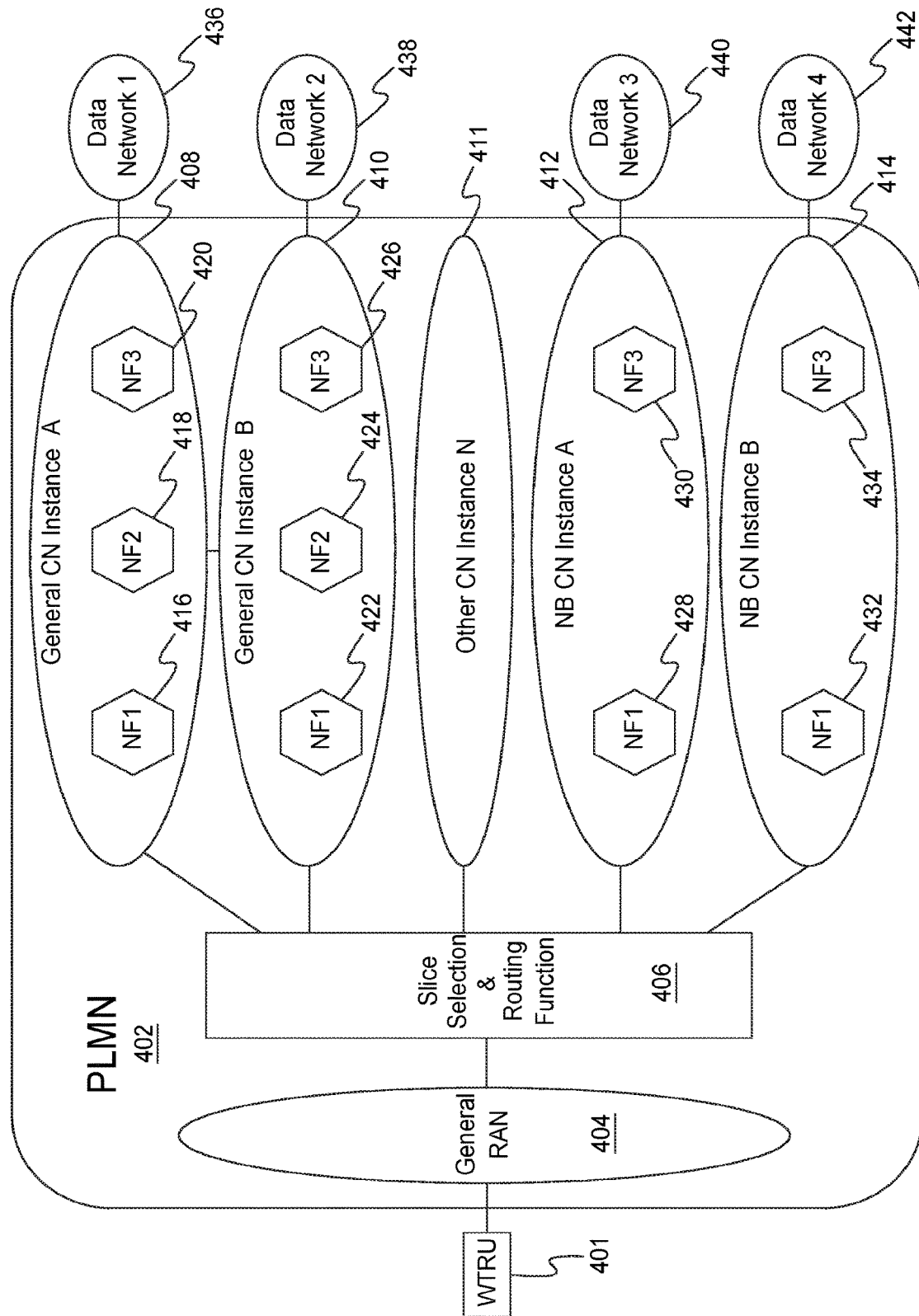
FIG. 4 is a diagram illustrating an example of network slice selection per service offered by a network.

Referring now to FIG. 4, an example of network slice selection per service provided by a network is illustrated. The slice selection and routing function 406 may be provided by the RAN 404, which may be similar to a conventional NAS node selection function. Alternatively, a CN-provided function may perform that task. The slice selection and routing function 406 may route signaling to CN instances such as General CN Instance A 408, General CN Instance B 410, Other CN Instance N 411, NB CN Instance A 412, and NB CN Instance B 414, based on WTRU-provided 401 information, CN-provided information, or the similar.

All network instances of the PLMN 402 may share radio access, and there may be a need for separating any access barring and (over)load control per slice. This may be accomplished by conventional methods of separated access barring and (over)load control, which is provided per PLMN operator for network sharing. Using this method, there may be CN resources such as transport network resources that cannot be fully separated. For example, the General CN Instance A 408 and General CN Instance B 410 may have control plane and user plane functions as their network functions. For example, the General CN Instance A 408 may include NF1 416 and NF2 418 for its control plane functions and NF3 420 for its user plane function for Data Network 1 436. Similarly, the General CN Instance B 410 may include NF1 422 and NF2 424 for its control plane functions and NF3 426 for its user plane function for Data Network 2 438. Using the NF1s 416 422, NF2s 418 424, and NF3s 420 426, the General CN Instance A 408 and General CN Instance B may provide full core network functions to the WTRU 401.

The NF1 428 and NF3 430 in Narrowband (NB) CN Instance A 412 may provide a narrowband service for the WTRU 401 for Data Network 3 440. Similarly, NF1 432 and NF3 434 in Narrowband (NB) CN Instance B 414 may provide another narrowband service to the WTRU 401 for Data Network 4 442. The narrow band services may be an Internet of Things (IoT) services. In this case, the WTRU 401 may be an IoT device. Since an IoT service does not require a full core network functionalities, the NB CN Instance A 412 and NB CN Instance B 414 may include fewer number of network functions than the General CN Instance A 408 and General CN Instance B 410 may include. This means that, in order to provide narrowband services, the NB CN Instance A 412 and NB CN Instance B 414 do not need to include NF2s as the General CN Instance A 408 and General CN Instance B 410 do.

Figure 5:
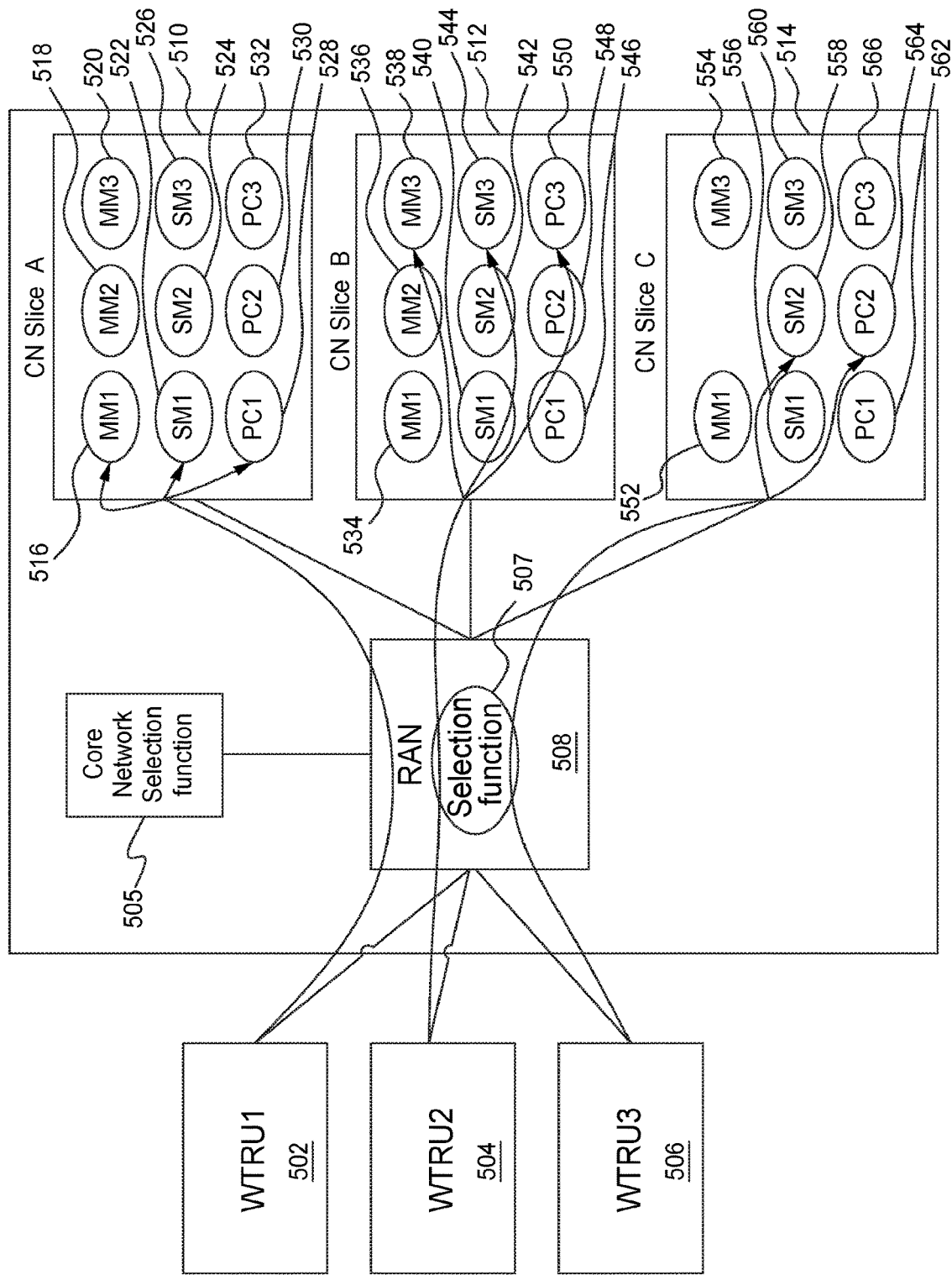
FIG. 5 is a diagram illustrating an example of network slice selection based on a multi-dimensional descriptor.

Referring now to FIG. 5, an example of network slice selection based on a multi-dimensional descriptor is shown. The embodiment shown in FIG. 5 may use a multi-dimensional descriptor for network slice selection. In order to perform the network slice selection, the selection principle may enable the appropriate selection function to deliver a certain service even within a class of functions designed for a certain use case. In other words, based on selection criteria, a correct network slice and correct network functions within the network slice may be assigned to applications running in WTRUs 502, 504, 506 for network services that the applications require. The applications running in WTRUs 502, 504, 506 can provide multi-dimensional descriptors. Such multi-dimensional descriptors may contain an application ID, service descriptor (e.g., enhanced mobile broadband service, critical communications, or massive machine type communications), and the like.

As described above, in order to choose the appropriate network slice and network functions, a network may use a multi-dimensional descriptor along with other information (e.g., WTRU's subscription) available in the network. This may be referred to as a multi-dimensional selection mechanism. The following may be possible options to select network slices and functions based on a multi-dimensional descriptor. A first option may be a two-step selection mechanism. Along with information (e.g., WTRU's subscription) available in a network, a selection function 507 in a RAN 508 may use an application ID (part of the multi-dimensional descriptor) to select an appropriate core network slice among CN Slice A 510, CN Slice B 512, and CN Slice C 514. The selection function 507, then, may use a service descriptor (part of the multi-dimensional descriptor) to select appropriate network functions within the selected network slice. Alternatively, a core network selection function 505 may use the application ID to select an appropriate core network slice among CN Slice A 510, CN Slice B 512, and CN Slice C 514. The core network selection function 505, then, may use a service descriptor to select appropriate network functions within the selected network slice.

In an embodiment, a WTRU1 502 may run an application that requires an enhanced mobile broadband such as 4K/8K UHD and Hologram. The application may transmit its multi-dimensional descriptor to a RAN 508 along with its application ID. In this case, the multi-dimensional descriptor may include the enhanced mobile broadband for its service descriptor. A selection function 507 in the RAN 508 may use the application ID to select CN Slice A 510 that provides the enhanced mobile broadband service for its appropriate core network slice. After that, the selection function 507 in the RAN 508 may use a service descriptor (i.e. enhanced mobile broadband) to select MM1 516, SM1 522, and PC1 528. MM1 516 in the CN Slice A 510 may provide mobility management functions for the WTRU1 502 among all the mobility management functions (i.e. MM1 516, MM2 518, MM3 520). SM1 522 and PC1 528 may provide appropriate session management and packet core functions for the enhanced mobile broadband service among all the session management (i.e. SM1 522, SM2 524, SM3 526) and packet core functions (i.e. PC1 528, PC2 530, PC3 532) in the CN Slice A 510. Thus, the selection function 507 in the RAN 508 may select the MM1 516, SM1 522, and PC1 528 as the appropriate network functions to provide the enhanced mobile broadband service.

In another embodiment, the WTRU2 504 may run an application that requires critical communications such as motion control, autonomous driving, and factory automation. As described above, the application that runs a critical communication service may transmit its multi-dimensional descriptor to a RAN 508 along with its application ID. The multi-dimensional descriptor may include critical communications for its service descriptor. A selection function 508 in the RAN 508 may use the application ID to select a CN Slice B 512 that provides a critical communication service for its appropriate core network slice. After that, the selection function 507 in the RAN 508 may use the service descriptor, the critical communications, to select MM3 538, SM3 544, and PC3 550. MM3 538 in the CN Slice B 512 may provide mobility management functions for the WTRU2 504, among all the mobility management functions MM1 534, MM2 536, MM3 538. SM3 544 and PC3 550 may provide appropriate session management and packet core functions for the critical communication service among all the session management SM1 540, SM2 542, SM3 544 and packet core functions PC1 546, PC2 548, PC3 550. Thus, the selection function 507 in the RAN 508 may select the MM3 538, SM3 544, and PC3 550 for the critical communications service.

In another embodiment, the WTRU3 506 may run an application that requires massive machine type communications such as sensor network. As described above, the application that runs massive machine type communication service may transmit its multi-dimensional descriptor to a RAN 508 along with its application ID. The multi-dimensional descriptor may include massive machine type communications for its service descriptor. A selection function 507 in the RAN 508 may use the application ID to select a CN Slice C 514 that provides a massive machine type communication service for its appropriate core network slice. After that, the selection function 507 in the RAN 508 may use the service descriptor, the massive machine type communications, to select SM2 558, and PC2 564. In this embodiment, the WTRU3 506 may be an IoT device such as a sensor. Because IoT devices does not require full core network functions like in the CN Slice A 510 and CM Slice B 512, the CN Slice C 514 may include fewer number of mobility management functions (i.e. MM1 552 and MM3 554) than the CN Slice A 510 and CN Slice B 512 include (i.e. MM1 516, 534, MM2 518, 536, MM3 520, 538). In addition, the WTRU3 506 may not need to connect a mobility management function to receive the massive machine type communication service. Thus, the CM Slice C 514 may not need to provide MM1 552 and MM3 554 to the WTRU 506 for the massive machine type communication service. The SM2 558 and PC2 564 in the CN Slice C 514 may provide appropriate session management and packet core functions for the massive machine type communication service among all the session management and packet core functions (i.e. SM1 556, SM2 558, SM3 560, PC1 562, PC2

564, and PC3 566). Thus, the selection function 507 in the RAN 508 may choose the SM2 558 and PC2 564 for the massive machine type communication service.

Another option may be a one-step selection mechanism. Along with information (e.g., WTRU's subscription information) available in a network, a selection function 507 within a RAN 508 or a selection function 505 in a core network may use an application ID and a service descriptor (e.g., the multi-dimensional descriptor) to select an appropriate network slice and its respective network functions in CN Slice A 510, CN Slice B 512, and CN Slice C 514. It may then direct the WTRUs 502, 504, 506 to the selected network slice and functions accordingly.

As described above, various embodiments of how CP and UP functions can be grouped per slice or across slices are illustrated in FIGS. 2A, 2B, 2C, 3, 4, and 5. However, specific CP and UP functions may need to be further described. The impact on a 5G communication system, as a result of sharing such functions, may also need to be considered. For example, if paging is a shared network function among different network slices, then it needs to be described how network slices use or trigger the shared paging function to send a page to a WTRU. Conversely, if paging is not a shared network function, then it needs to be described how each network slice can send paging messages to a WTRU. If each network slice sends paging messages to each of WTRU separately, there may be a need to use one or more identities for the WTRU.

There may be particular network services that require different network functions performed by different CP and/or UP nodes. For example, in a 5G system, a device or a WTRU may send IP and/or non-IP data. The non-IP data can take two forms: non-IP PDUs and Ethernet frames. Furthermore, the transport requirement for IP vs non-IP data may be different. Specifically, the type of data that a network supports and transports may have an impact on a network slice selection because different CP and UP functions are required to support the type of data that a WTRU transmits. Another type of data that a network may support is Information Centric Networking (ICN) data, where a different network slice can be used to transport such ICN type data. Embodiments described herein may handle different data support by using independent network slices.

As described above, grouping CP nodes in an independent network slice or as shared functions across network slices, is a high level design. Embodiments how CP nodes and functions operate may need to be further described. More specifically, embodiments such as which nodes perform authentication and paging may need to be listed. More importantly, the impacts on a 5G system by performing actions, for example, paging in an independent or shared node, may also need to be described in detail.

In addition, other embodiments that describe a proper selection of a network function after a network slice is assigned may need to be addressed. For example, where a slice comprises a shared CP and an independent UP node, after a WTRU is assigned to receive services from two different network slices that have independent UP nodes, the selection of a correct UP node (i.e., how data will be forwarded to the correct UP node) may need to be addressed.

Additionally, a location of a responsible node for authentication, authorization, and identification may need to be described. As shown in FIG. 2B, there may be several questions about "where" certain important security functions may reside. If an operator would like to have a centralized control plane management, a "Shared CN CP Functions 210" may take the registration of WTRU 202. Therefore, this Shared CN CP 210 node may be responsible for authentication as well as identity management. In response to the authentication process performed by the Shared CN CP Functions 210, how the CN instance slice #1 212 and CN instance slice #2 214 use the authentication information and how the authentication information maps the WTRU 202 identities (e.g. an external ID) to old identities within a network may need to be addressed.

Handling of a network slice in a multi access network (AN) environment, such as 3GPP and non-3GPP access network, may need to be addressed. The embodiments described above may address cases where the AN corresponds to a 3GPP-based AN. However, 5G systems may include both 3GPP and Non-3GPP access networks. Thus, a 5G system should consider all allowed types of access networks when it manages network slices.

Delayed network slice selection may need to be addressed in certain scenarios. Such a scenario where a network may not select a network slice at initial registration or attach may be illustrated in FIG. 2B. For example, a WTRU 202 may register to shared CN CP functions 210. A network slice may then be selected when there is a need to use a particular function from non-shared CP functions in CN Instance #1 212 and CN Instance #2 214. As a result, a network slice selection may take place to utilize the particular non-shared CP functions. Such procedures may need to be detailed, especially with respect to how and which nodes are responsible for the network slice selection.

Figure 6:
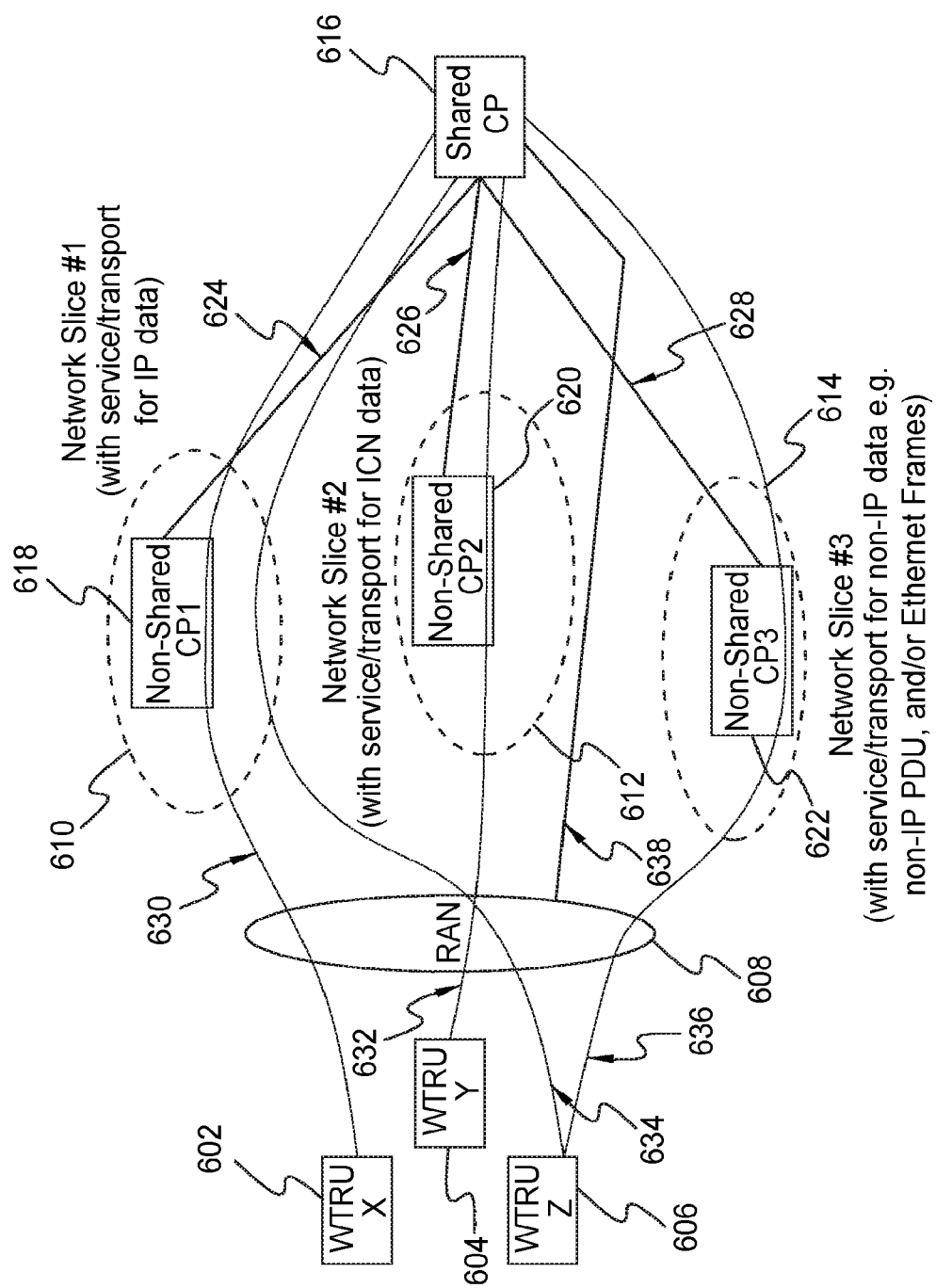
FIG. 6 is a diagram illustrating overall architecture for network slicing per data types.

Referring now to FIG. 6, a diagram illustrating an overall architecture for network slicing per data types is shown. As described above, different network slices may be used for different data types that are supported by WTRUs 602, 604, 606. In a 5G system, a network slice may support both IP and non-IP data type. A network slice can be used to carry IP data, and another network slice can be used to carry non-IP data. This may be referred to as a network slice per data type. In addition to the IP and non-IP data type, a network slice may carry different non-IP data types. This means, a network slice can be used to carry non-IP PDU data and another network slice can be used to carry Ethernet frames. This may be referred to as a network slice per non-IP data type. Although the non-IP data may refer to both non-IP PDU and Ethernet frames, in some embodiments these types of non-IP data may be considered to be different.

FIG. 6 shows an example with three network slices (i.e. Network Slice #1 610, Network Slice #2 612, and Network Slice #3 614) to service and transport different data types. These network slices, Network Slice #1 610, Network Slice #2 612, and Network Slice #3 614, may share a set of CP functions referred to as "Shared CP 616." Each of Network Slice #1 610, Network Slice #2 612, and Network Slice #3 614 may have their own independent/isolated set of CP functions referred to as "Non-Shared CP #," where "#" may refer to the slice ID at least within the CN (i.e. Non-Shared CP1 618, Non-Shared CP2 620, or Non-Shared CP3 622). In this example, the Network Slice #1 610, Network Slice #2 612, and Network Slice #3 614 may carry a specific data type, such as IP data type, non-IP data type (e.g., non-IP PDU and/or Ethernet Frames), or data type related to Information-centric Networking (ICN). The ICN data may also be non-IP data, IP data that encapsulates ICN PDUs, or other forms of transporting ICN PDUs.

The Non-Shared CP1 618, Non-Shared CP2 620, and Non-Shared CP3 622 may also have interfaces 624, 626, 628 with a main or share CP function 616, respectively. As shown in FIG. 6, WTRUs 602, 604, 606 may have access 630, 632, 634, 636 to Network Slice #1 610, Network Slice

2 612, and Network Slice #3 614. For example, WTRU Z 606 may have access 634 to Network Slice #1 610 for IP data. The WTRU Z 606 may have access 636 to Network Slice #3 614 for non-IP data. The WTRU X 602 may have access 630 to Network Slice #1 610 for IP data. The WTRU Y 604 may have access 632 to Network Slice #2 620 for ICN data.

Moreover, the WTRUs 602, 604, 606 may have direct access or interface 638 with the shared CP 616 via the RAN 608, or indirect access or interface via the Non-Shared CP1 618, Non-Shared CP2 620, and Non-Shared CP3. When an indirect access or interface is established, the access 630, 632, 636 may be used to connect to the shared CP 616 via Non-Shared CP1 618, Non-Shared CP2 620, and Non-Shared CP3. For example, the WTRU X 602 may be connected to the shared CP 616 via the Non-Shared CP1 618 using the interface 630. The WTRU Y 604 may be connected to the shared CP 616 via the Non-Shared CP2 620 using the interface 632. The WTRU Z 606 may be connected to the shared CP 616 via the Non-Shared CP3 622 using the interface 636. When a direct access or interface is established, the access 638 may be used to connect the WTRUs 602, 604, 606 to the shared CP 616.

The WTRUs 602, 604, 606 may have direct contact or interface with the Non-Shared CP1 618, Non-Shared CP2 620, and Non-Shared CP3 in the Network Slice #1 610, Network Slice #2 612, and Network Slice #3 614. For example, when directly connected, the WTRU X 602 may have direct access 630 to the Non-Shared CP1 618. The WTRU Y 604 may have direct access 632 to the Non-Shared CP2 620. The WTRU Z 602 may have direct access 636 to the Non-Shared CP3 622.

In addition, the WTRUs 602, 604, 606 may have indirect access or interface to the Non-Shared CP1 618, Non-Shared CP2 620, and Non-Shared CP3 in the Network Slice #1 610, Network Slice #2 612, and Network Slice #3 614 via a shared CP node 616. When indirectly connected, the WTRU X 602 may use the access 624 to the Non-Shared CP1 618 via the shared CP 616. The WTRU Y 604 may use the access 626 to the Non-Shared CP2 620 via the shared CP 616. The WTRU Z 606 may use the access 628 to the Non-Shared CP3 622 via the shared CP 616.

The following embodiments may include selection of a network slice based on support or need for non-IP data. As explained above, the term "non-IP data" may refer to all forms of non-IP data (e.g., non-IP PDU, Ethernet Frames, ICN data, etc.) It is noted that the term "Non Access Stratum (NAS)" may be used to refer to higher layer messages above the radio, such as the conventional NAS protocol. However, NAS may be any other protocol that runs between WTRUs and CP functions in a CN and is not necessarily limited to the conventional NAS protocol. The selection of a network slice for a WTRU can be done at a RAN or at a CN.

A WTRU may, upon establishing a radio connection, indicate that the requested service is non-IP data. This indication may be in any form, such as a capability or explicit service type, or it may be inferred from the WTRU type. The WTRU may also indicate the need or request for non-IP service in any of its NAS messages that are either related to mobility or session management procedures.

A RAN may take this information or indication into account and may select a network slice that supports this service. The RAN node may then forward the WTRU's higher layer message (e.g., NAS) to the CP function in that network slice. Alternatively, the RAN may use other information from the WTRU to perform the selection of the most appropriate CP function in the CN. The RAN may then send this information to the CP function.

The CP function in the CN may receive a message from the WTRU with an indication for non-IP data. The CP function may verify if the specific type of non-IP data that is requested can be provided by the CP function. If the CP can provide service for non-IP data, it may continue to process the WTRU request. Otherwise, the CP function may redirect the WTRU message to another network slice using a Dedicated Core Network (DECOR) solution. This embodiment may assume that the CP function has local information or configuration to determine the network slice or the CP address within a network slice that can serve the WTRU for the requested service, in this case, non-IP data. When determining the target network slice to serve the WTRU for non-IP data, the current CP function may input the service type (i.e., in this case "non-IP data") into its local look-up function.

In an embodiment, a WTRU may already be registered in the network for a particular service (e.g., IP-data service or non-IP data). The WTRU may support service for a secondary data type, and as such, may want to get the service. The WTRU may send a request to get a secondary service for a different data type which may be offered by another network slice. The methods to achieve this such as when a WTRU may need to do so are described herein.

When a WTRU needs to select a secondary service, one network slice may provide support for different services. For example, a network slice may be deployed to provide connectivity for the Internet of Things (IoT), for which there may be different connection or transport modes. One IoT application may require an IP connection, while another may not if the data is encapsulated in a control plane message. Thus, the general service type may be IoT; however the specific service can be "IP for IoT" or "Data over CP for IoT."

Therefore, one network slice may actually be used to provide at least these two types of transports or connections for the WTRU. It is therefore important for the WTRU to know whether or not the same slice can provide more than one service. If so, the WTRU needs to know what the services are provided by the network slice. This may help the WTRU to determine whether a new network slice has to be selected and registered with, or if the WTRU can simply request the service from the existing network slice. The following embodiments may address this issue.

Figure 7A:
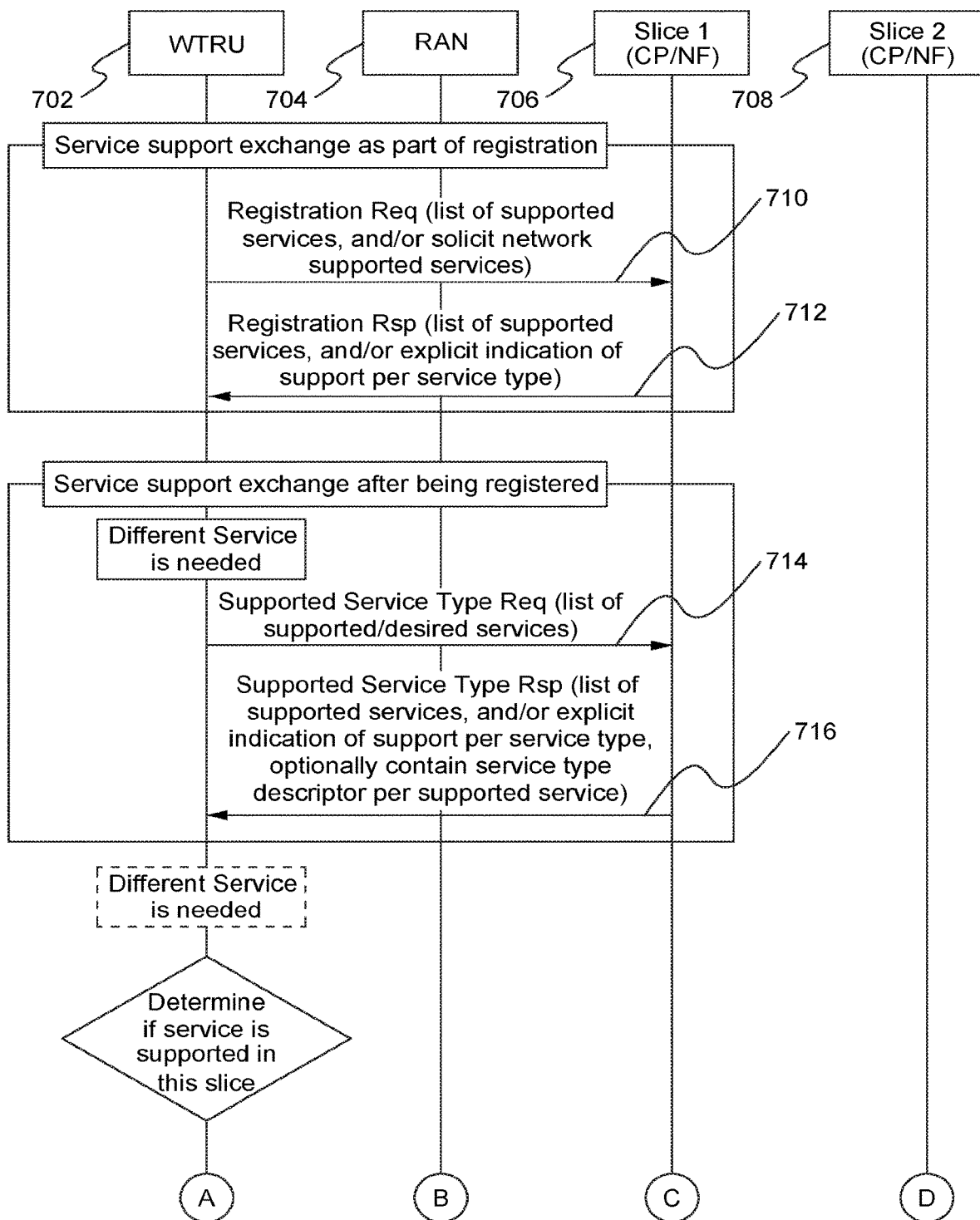
FIG. 7A is a signaling diagram illustrating a slice selection for service supported by the network slice.
Figure 7B:
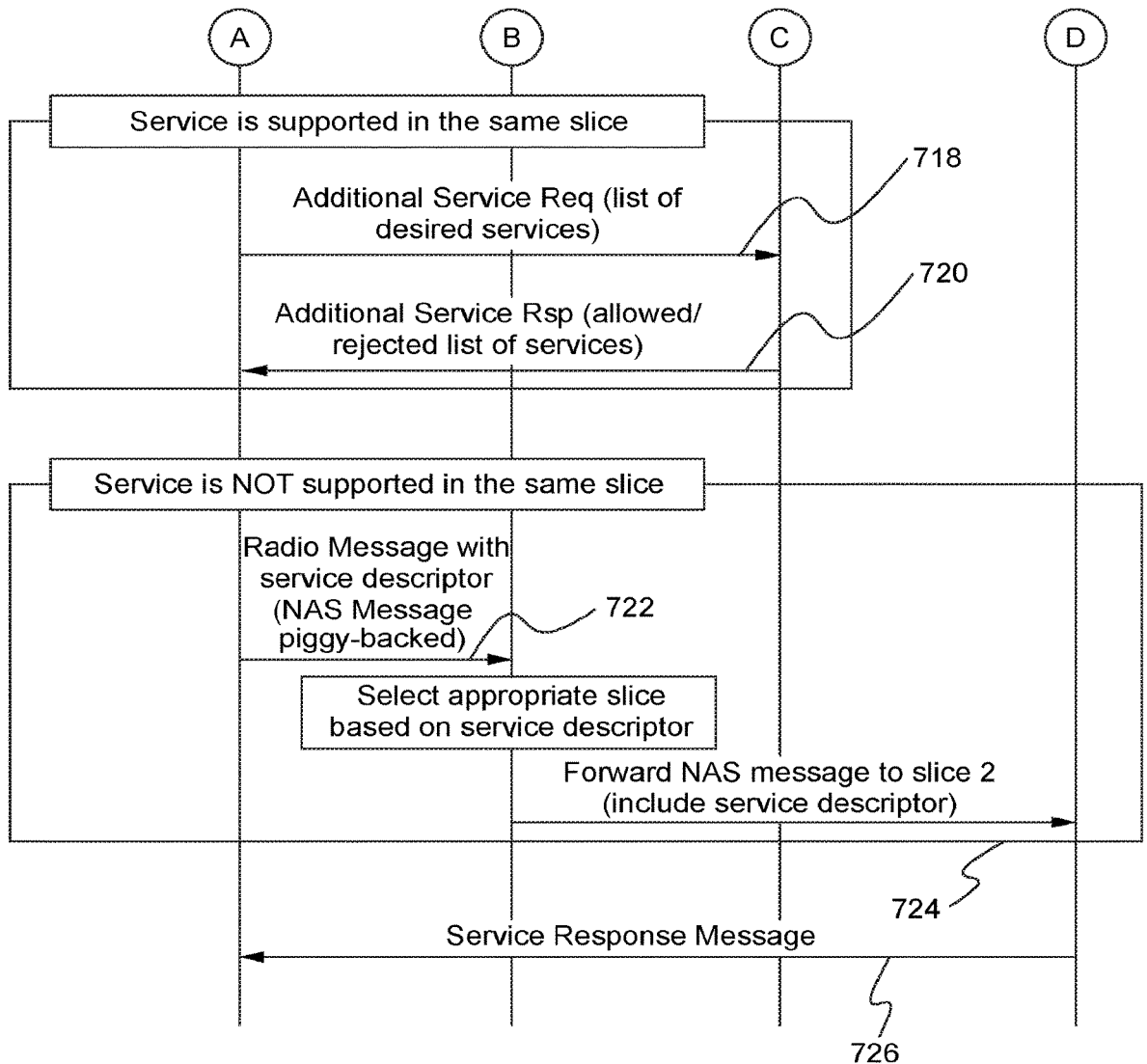
FIG. 7B is a continuation of FIG. 7A.

Referring now to FIGS. 7A and 7B, a signaling diagram illustrating a network slice selection for service supported by the network slice is shown. The WTRU 702 may transmit the Registration Request message 710 to the CP function of the network. The Registration Request message 710 may include a list of supported services or a list of services that the WTRU 702 is capable to receive (hereinafter referred to as "supported services"). Alternatively, the WTRU 702 may simply request to be informed of the list of services that the current network slice (or the current CP within this slice) supports. This indication of supported services, or the solicitation of the network's supported services, may be done or included in the Registration Request message 710 that is sent to the network.

If the WTRU 702 is already registered and it wants to determine whether or not the network supports other services, the WTRU 702 may send a new control message by, for example, NAS signaling or a Supported Service Type Request message 714. In this Supported Service Type Request message 714, the WTRU 702 may either indicate its supported and/or desired services, or it may solicit the network to provide the list of services that are supported in the network.

The network (e.g., any CP node or NF in the network) may receive a NAS message with a list of WTRU-supported services, or with a solicitation request to inform the WTRU 702 about the services that are supported in the network. The network may verify if the WTRU's subscription allows such information to be provided to the WTRU 702, which may also be based on the network policy. The network may determine to send a list of supported network services in the Supported Service Type Response message 716 to the WTRU 702. The network may send a NAS message and may indicate the supported services in the NAS message.

Alternatively, if the request from the WTRU 702 is for a specific service, the network may send a response with a {service type, support} indication, where the "service type" reflects the particular service about which network support is requested, and the "support" indicates if the service is supported or not. The network may send this list in any NAS message, either as part of the registration process, or when the WTRU 702 sends any NAS message that contains such a request.

For a given network slice with which the WTRU 702 is registered, the WTRU 702 may save the supported services in that network slice as determined using the embodiments described above. When the WTRU 702 requires or needs new services, the WTRU 702 may check the list of supported services in the network slice that the WTRU 702 is registered. If the service is indicated to be supported, then the WTRU 702 may simply send a NAS message to request the service. The NAS message may be sent to this network slice or to the CP/NF within the network slice to which the WTRU 702 is registered. The lower layer messages (e.g., radio messages) may contain a service indicator that points to this network slice. This may ensure that the service request, or any NAS message that may be used to obtain a new service, may be sent to the appropriate network slice (e.g., the network slice with which the WTRU 702 is already registered).

On the other hand, if the WTRU 702 determines that the service needed is not supported in the network slice, the WTRU 702 may then send another radio message 722 (e.g. RRC message). This radio message 722 may encapsulate a NAS message for registration. The radio message 722 may include a corresponding service descriptor associated with the Slice 2 708, which can be in any format to indicate the desired service type. The RAN 704 or the slice selection function may use this parameter to pick the appropriate network slice and may forward the NAS message 724 to the selected network slice. It should be noted that the NAS registration message may be different from the NAS message used to get a service within the same network slice. The selected network slice, the Slice 2 708 here, may send a Service Response message 726 to the WTRU 702.

Thus, when a required service is supported in the current network slice, the WTRU 702 may send the Additional Service Request message 718. If the WTRU 702 needs to get the service from another network slice, the WTRU 702 may then send a registration message to first register in that network. The WTRU 702 may ensure that the lower layer parameter (e.g., dedicated core network type, "WTRU usage type," "service descriptor," etc.) reflects a different service type and/or a different network slice from that which the WTRU 702 is already registered.

The following embodiments may include a responsible node for security functions and identity management in network slicing. In an embodiment, the "Shared CN CP Functions" may be responsible for the registration (e.g., Attach/TAU) procedure. A Registration (Attach/TAU) Request message from a WTRU may terminate in Shared CN CP Functions. This registration request message may contain important WTRU related parameters such as capabilities, (e)DRX parameters, PSM information or the like.

At this point, depending on whether the WTRU uses IMSI or an alias for identification purpose, the Shared CN CP Functions may retrieve WTRU's IMSI number or the similar either by forcing the WTRU to send it (e.g., through the Identification Procedure in NAS specs) or by simply receiving it from the previous anchor node (e.g., an MME, SGSN or another Shared CN CP Functions) where the WTRU was registered. In order to facilitate some of the following procedures, the Shared CN CP Functions may, once the registration phase has succeeded and completed, send the IMSI number to the CN instance slice #1 and slice #2. This may ensure that both slices are made aware of the WTRU's IMSI number or the similar identification information.

Another important factor is that the WTRU may get its "temporary" number, whether it is a GUTI or S-TMSI, allocated from the Shared CN CP Functions. With this mechanism, the slices may be hidden from the WTRU, which may believe that it is communicating with only one node, the Shared CP node.

Upon reception of the "Registration Request" message, the Shared CN CP Functions may contact the Home Subscriber Server (HSS) and ask for Authentication Vectors. After receiving the vectors, the Shared CN CP Functions may start an authentication procedure toward the WTRU based on the current mechanisms. If the WTRU passes this phase, the Shared CN CP Functions may send a message to both instance Slice #1 and Slice #2 informing them that this WTRU has been successfully authenticated. At this point, both Slice #1 and Slice #2 may set flags in their corresponding databases and consider the WTRU as completely "valid." The Shared CN CP Functions may also start a Security Mode Control procedure toward the WTRU and then pass security contexts to the Slice #1 and Slice #2 to be used for the User Plane security.

A shared RAN may only have a signaling connection to the Shared CN CP Functions, so all communications, even between instance Slice #1/Slice #2 and the WTRU, may go through the Shared CN CP Functions. As an example, if the instance Slice #1 has something to be sent to the WTRU, it may not need to know the state (e.g., idle/connected mode) of the WTRU. It may just send a request to the Shared CN CP Functions which, in turn, will page the WTRU and establish a signaling connection.

In another embodiment, a mechanism that combats denial of service attacks toward a WTRU may be included. A first authentication message sent from Shared CN CP Functions to the WTRU may have a new parameter (e.g., a "token") that is derived from the WTRU's IMSI number and RAND. After the authentication process is complete, the Shared CN CP Functions may pass this token to other network slices such as Slice #1 and Slice #2 for future use. If the operator's configuration is subject to dynamic change in a way that the Slice #2 may, for example, take over both Control and User Plane, then Slice #2 may include the "token" in the subsequent NAS messages to the WTRU. These (subsequent) messages shall be integrity protected even for the reject cases.

The WTRU may communicate with the Shared CN CP Functions. This means that the Shared CN CP Functions may be aware of any external ID that the WTRU may have.

For that reason, the Slice #1 and Slice #2 may inform the Shared CN CP Functions about any external ID that the WTRU is assigned or is using. The mapping between the external IDs, IMSI and the temporary WTRU ID may be done in the Shared CN CP Functions. When the User Plane bearers are established by the Shared CN CP Functions, the Shared CN CP Functions may inform the corresponding entity of the used identities for User Plane connections.

The following embodiments may include split functionality management. As shown in FIG. 2B, the load on Shared CN CP Functions 210 may increase dramatically based on the number of registered WTRUs and the number of slices that are connected to the Shared CN CP Functions 210. In the following embodiments, it may be assumed that a network operator has configured their network according to the FIG. 3 (i.e., there are only two CN instance slices connected to the Shared CN CP Functions). It may also be assumed that all IP traffic may reside in Core Network Instance #1 308 and all Non-IP traffic may be in Core Network Instance #2 310.

In order to decrease the load on the Shared CN CP Functions, the Shared CN CP Functions may handle "Mobility Management" portion of the chosen protocol between a WTRU and a core network. As an example, assuming that the WTRU can send both Mobility Management (MM) and Session Management (SM) messages in a secured way, the Shared CN CP Functions may deal with the MM messages.

Accordingly, the MM messages may terminate in the Shared CN CP Functions. The SM messages may be passed by the Shared CN CP Functions to either Slice #1 or Slice #2. As previously stated, Slice #1 may be the terminating node for IP traffic and Slice #2 may be the terminating node for the Non-IP traffic The following embodiments may distinguish between network slices and the routing of data under the assumption that a WTRU has a short packet to send and a network is configured to allow the WTRU to send its data, whether it is IP or Non-IP, over Control Plane.

In an embodiment, a new protocol layer (in-line with the Session Management) may be used to transfer all Non-IP related data. When a WTRU needs to send a short Non-IP packet over the control plane, it may piggy-back the packet in this new protocol message format and may transmit to the Shared CN CP Functions. At the Shared CN CP Functions, the message may be integrity checked and the content of the message, which may be the short Non-IP packet, may be extracted to be forwarded to the Slice #2 using appropriate protocol on that interface. The deciphering of the packet may be done in the Shared CN CP Functions. However, to ease the functionality and decrease the load, the deciphering may be performed at the Slice #2.

As for the IP-packets, the WTRU may simply piggy-back them onto certain SM messages and may send them to the Shared CN CP Functions. The Shared CN CP Functions may perform an integrity check on the message. After that, the Shared CN CP Function may extract the IP-Packet and send it to Slice #1. The ciphering/deciphering options may be the same as those discussed above. It should be noted that if the ciphering/deciphering is to take place in the slices, the Shared CN CP Functions may have to pass the Ciphering Keys as well as Algorithms to the slices.

In another embodiment, in the MM and SM protocol discussed above, certain SM messages may be used to carry both IP and Non-IP packets over the Control Plane. The SM message may be piggy-backed onto the MM message. In this example, the WTRU may send an indication, preferably in the MM message, to the Shared CN CP Function. The indication may inform the Shared CN CP Functions that the message is carrying a SM message and whether the content of the message (i.e., the piggy-backed data) is IP or Non-IP. Using this indication, the Shared CN CP Functions may know which node is to be the actual recipient of the packet. As discussed above, the Shared CN CP Functions may check the integrity of the message first. The ciphering/deciphering may follow the same mechanism as discussed above. One major difference is that both Slice #1 and Slice #2 may support the SM protocol.

Figure 8:
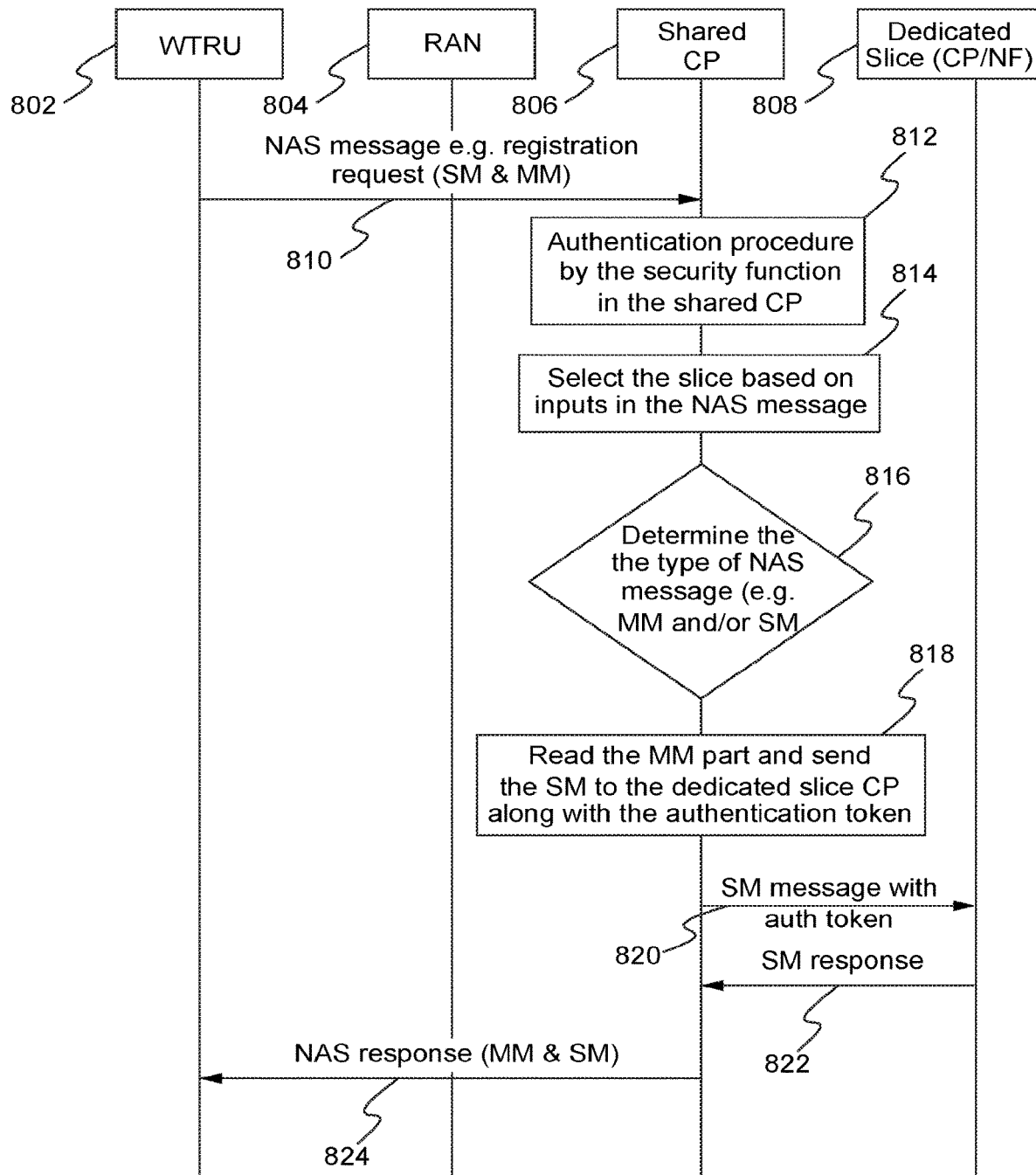
FIG. 8 is a signaling diagram illustrating a dedicated slice selection at a shared CP node.

Referring now to FIG. 8, a signaling diagram illustrating a dedicated slice selection at a shared CP node is shown. A Shared CP 806 may provide a WTRU 802 access to a Dedicated Slice 808 for a specific service provided by the Dedicated Slice 808. The WTRU 802 may transmit a NAS message 810 (e.g. registration request) that indicates a request to establish a connection for the specific service. As described above, the NAS message 810 may include MM messages and SM messages. The NAS message may include a user date type indication that indicates an IP data or non-IP data. A RAN 804 may have a signaling connection to the Shared CP 806, so all communications may go through the Shared CP 806. Upon receiving the NAS message 810, the Shared CP 806 may authenticate the WTRU 802 using authentication function in the shared CP network function (NF) at step 812.

If the WTRU 802 is successfully authenticated, at step 814, the Shared CP 806 may select, based on the user data type indication in the NAS message 810, a Dedicated Slice 808 for the specific service. Upon selecting the Dedicated Slice 808, the Shared CP 806 may determine the type of the NAS message 802 (e.g. MM and/or SM) based on the user data indication at step 816, and read MM messages at step 816. The Shared CP 806 then passes SM messages 820 to the Dedicated Slice 808 along with the authentication token at step 818. Specifically, the Shared CP NF may read the MM messages and send the SM messages 820 to the CP of Dedicated Slice 808. This means that all MM messages may terminate in the Shard CP NF. However, the SM messages may simply be passed to the dedicated network slices by the Shared CP NF.

Upon receiving the SM message with the authentication token 820, the Dedicated Slice 808 may transmit the SM response message 822 to the Shared CP 806 to establish a communication link between the WTRU 802 and the Dedicated Slice 808. The Shared CP 806 may combine the SM response message 822 with MM response message, and then send the NAS response message 824 to the WTRU 802.

The Shared CP 806 may select the Dedicated Slice 808 based on whether the attached request message is for the transmission of the control plane data or an IP connection. The Shared CP 806 may provide an authentication token to the selected Dedicated Slice 808 as an indication of authentication by the Shared CP NF. The Shared CP 806 may connect the WTRU 802 to the Dedicated Slice 808 to provide the specific service. Thus, the control plane of the WTRU 802 may be connected to the Dedicated Slice 808 through the Shared CP 806.

The following embodiments may include multi-access networks and network slice management. Based on the multi-dimensional descriptor described above, a WTRU may provide a descriptor or template to indicate parameters such as the type of service requested from the network. When the request is received through either a TWAN or an ePDG (hereinafter referred to as a "Non-3GPP Access Gateway" or "N3AGW"), the N3AGW may either perform Slice Selection based on the descriptor, or it may forward the request to a CN Slice Selection Node, such as a Central CP entity or even a 3GPP Access Network entity (e.g., a next generation eNB). This node may be a logical node that can be connected to one or more non-3GPP access points. This node may be pre-configured with information such that it can select the appropriate network slices or nodes to match the WTRU's provided service descriptor. This node may contain a mapping between a service descriptor and a network slice or CP/NF associated with a network slice.

The WTRU may include a SSID, a Network Service ID, or an Application ID that may be used to select a particular N3AGW. The WTRU may use network identifiers that are known or broadcast over the air (e.g., SSID) or through a L2 advertisement protocol (e.g., the Generic Advertisement Protocol of 802.11u) to select an AP that is known to connect to network with a particular service type (and hence slice) to connect to a N3AGW.

The selection of a particular network may allow the WTRU to identify networks that are capable of performing Slice Selection Functions. The WTRU may use an APN to signal to the N3AGW Network Nodes that are capable of performing Network Slice Selection. For example, the information provided by the WTRU may lead to the selection of a particular CP Entity that is capable of performing network slice selection. A WTRU may include the required service descriptor in the L2 MAC frame of a non-3GPP access technology.

The Network Slice Selection function may use parameters provided in the descriptor to determine whether the N3AGW is capable of supporting the services requested by the WTRU. If the N3AGW satisfies the requirements of the particular service specified in the descriptor, a CP Entity may proceeds with the selection of other CN specific functions. This may depend on other aspects of the descriptor as well as aspects of the subscriber information. Otherwise, the CP entity may choose to direct the WTRU to reselect to a different AN (e.g., both 3GPP and Non-3GPP based). The CP entity may choose a particular AN for the WTRU or may instruct the WTRU to perform selection of a new AN altogether.

The following description may address delayed network slice selection. As described above, a shared CP function may contain mobility management functionalities, whereas non-shared CP functions in various slices may contain session management functionalities. Accordingly, when a WTRU initially registers (i.e., attaches) with a network, which is a mobility management event, the WTRU may interact with the shared CP for mobility management. The network may not select the network slice at initial registration if the network does not need to select or use CP functions from the shared CP in different slices.

At the registration phase, however, the network may send information to the WTRU about possible network slices with which the WTRU is authorized to connect. As described above, the shared CP function may send the information about possible network slices based on WTRU capability and/or service type along with subscription information from the subscription database (i.e., similar to HSS). The WTRU may use the information during session management procedures with the network (e.g., PDU connection request).

A network slice may be selected during the session management (SM) procedure, which may include PDU connection establishment. During the SM procedure, the WTRU may include slice information that was previously received during attach procedure. With that network slice information, the WTRU may assist the shared CP function to select a slice or to direct the WTRU's SM request to the appropriate network slice. The network slice selection function may either be part of the RAN or the shared CP function. In either case, the session management may be directed to the appropriate slice.

The network slice selection function may consider the information in the SM message and make a decision to route (re-direct) the message to the network slice that can best meet the WTRU's session requirements. The information may include PDU connection type (IP vs. Non-IP), IP version (IPv4 or IPv6), application information (app ID), required quality of service, the network slice information received during attach/registration procedure, and the like.

Figure 9:
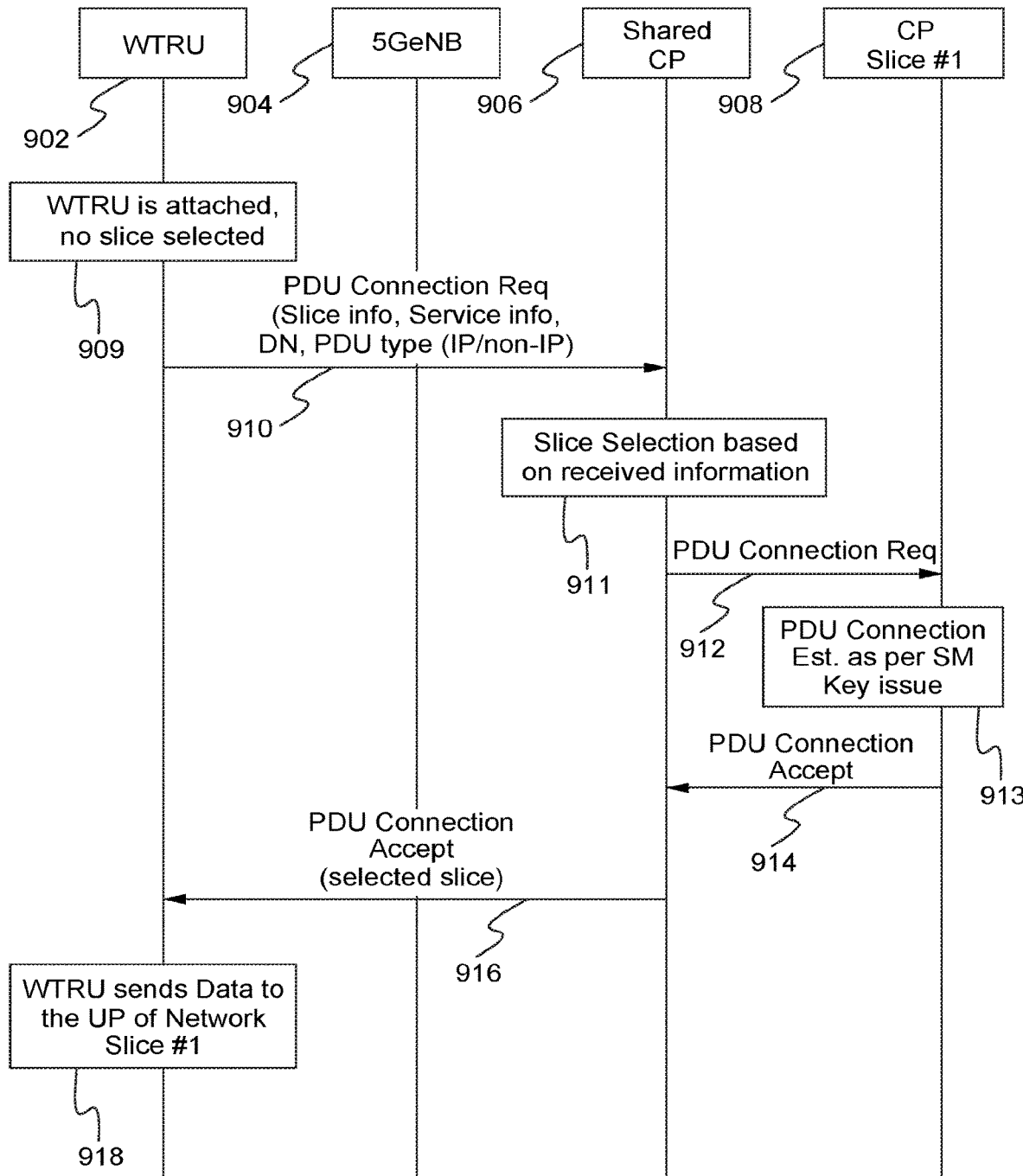
FIG. 9 is a signaling diagram illustrating a delayed network slice selection during session management procedure.

Referring now to FIG. 9, a diagram illustrating network slice selection when there is a session management request is shown. A PDU connection request may be an example of the SM procedure shown in FIG. 9. This procedure may extend to other SM call flows.

At step 909, the WTRU 902 may be attached to a non-shared CP but there is no network slice selected for the shared CP. The WTRU 902 may send the PDU connection request 910 to the Shared CP 906. The message may include one or more of the following parameters: connection type (IP vs. Non-IP), IP version (IPv4 or IPv6), application information (app ID), required quality of service (including but not limited to QCI value, priority, and required bit rate), the slice information (slice ID, type of slice such as enhance mobile broadband, mIoT, critical communications, etc.), Data Network name (similar to APN), and the like.

Upon receiving the PDU connection request 910, the Network Slice Selection Function in the Shared CP 906 may select a network slice based on the received parameters at step 911. Additional parameters may be used with the received parameters. Such additional parameters may include network configuration/local policy, and WTRU/user subscription information, which may either be received by the CP node during the initial attach procedure or during the network slice selection procedure. The Shared CP 906 may also consider congestion level of the control plane and user plane when it performs the slice selection determination.

The Shared CP 906 may forward the PDU connection request message 912 to the CP Slice #1 908, which is the non-shared CP function of the selected network slice. The non-shared CP function at the CP Slice 1 908 may execute the SM procedure and set up user plane connection based on the parameters received from the WTRU 902 at step 913. The non-shard CP function may transmit a PDU connection accept message 914 to the shared CP function at the Shared CP 906. After that, the PDU connection accept message 916 may be forwarded to the WTRU 902 via interface (similar to NAS) between the shared CP 906 and the WTRU 902.

The PDU connection accept message 916 may include information about the selected network slice for either the base station or the WTRU 902. The base station may route user plane messages to the appropriate network slice. The WTRU 902 may route the user plane data and other following control message (e.g., SM messages) to the selected network slice at step 918. Once the WTRU 902 is aware of the selected network slice, the data may be sent to the UP functions of the selected network slice.

In an embodiment, multiple network slices may be selected by the Shared CP 906 if the WTRU 902 sends another PDU connection request to the shared CP function based on the aforementioned parameters and the characteristics of the required data connection.

Figure 10:
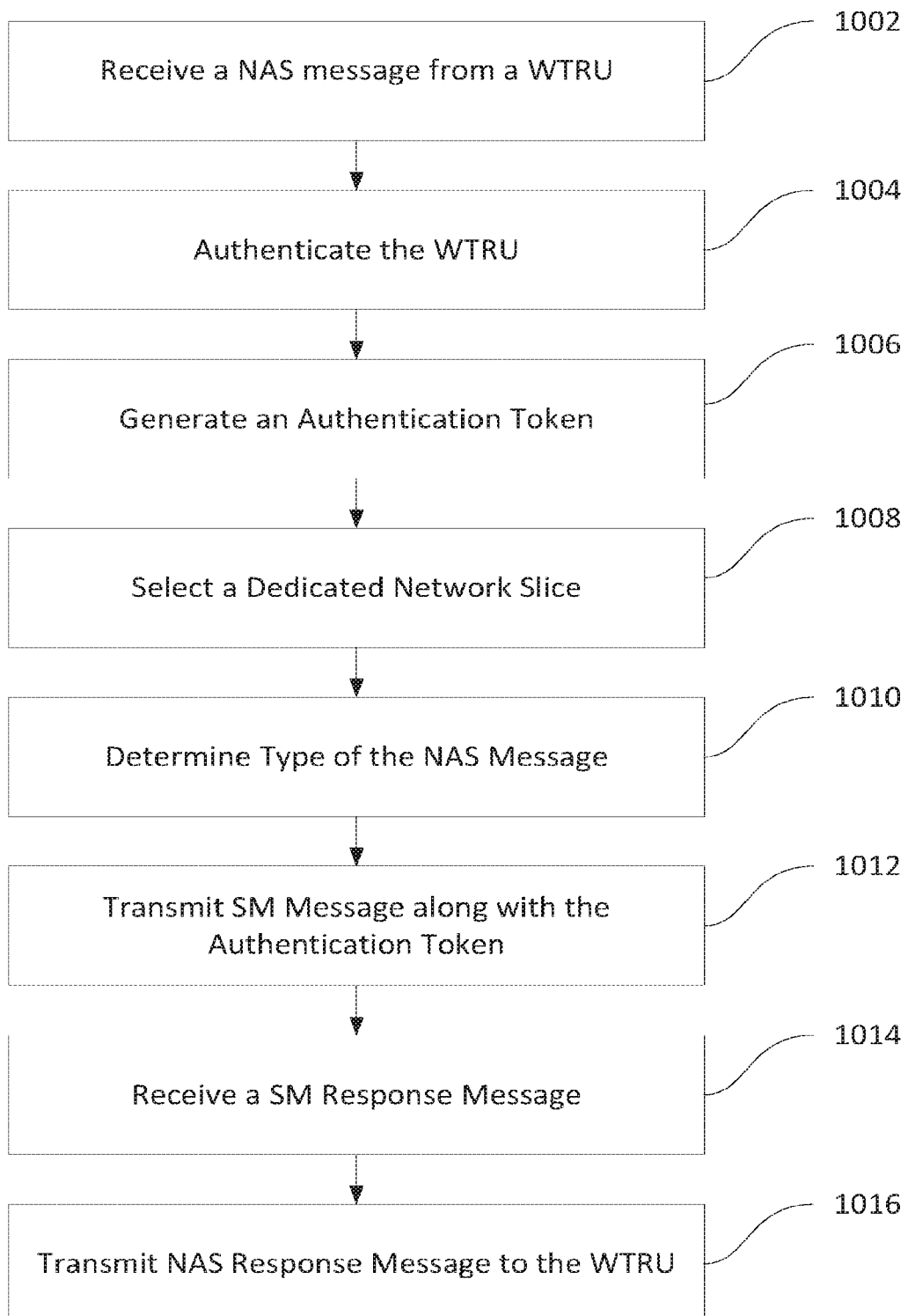
FIG. 10 is a diagram illustrating an example procedure for providing access to a dedicate network slice in a shared CP network function (NF).

Referring now to FIG. 10, a diagram illustrating an example procedure for providing access to dedicated network slices in a shared CP network function (NF) is shown. At step 1002, the shared CP NF in the shared CP node may receive a NAS message from a WTRU. As described above, the NAS message may include a MM message and a SM message. The MM message may include a registration request that indicates a request to establish a communication link between the WTRU and a dedicated network slice for the specific service that is provided by the dedicated network slice. The NAS message may also include a user data type indication that indicates an Internet Protocol (IP) data and a non-IP data. The non-IP data may include a non-IP Protocol Data Unit (PDU), an Ethernet frame, an Information Centric Network (ICN) data, or the like.

Upon receiving the NAS message, the shared CP NF may initiate an authentication function in the shared CP NF to authenticate the WTRU at step 1004. If the WTRU is successfully authenticated, the shared CP NF may generate an authentication token for the security and identity management at step 1006. At step 1008, the shared CP NF may select a network slice among multiple network slices for a user plane (UP) service provided by the network slice. The shared CP NF may select the network slice based on the user data type indication. The selected network slice may be a dedicated network slice to provide the UP service to the WTRU. At step 1010, the shared CP NF may determine a type of NAS message based on the user date type indication included in the NAS message.

After determining the type of NAS message, for example, MM or SM, the shared CP NF may transmit the SM part of the message to the non-shared CP NF in the selected network slice along with the authentication token at step 1012. The SM message may indicate the UP service provided by the selected network slice. At step 1014, the shared CP NF may receive a SM response message from the non-shared CP NF. The SM response message may indicate whether the selected network slice may provide the UP service or not. If the selected network slice provides the UP service, the shared CP NF may transmit a NAS response message that includes both MM and SM part to the WTRU to establish the communication link between the selected network slice and the WTRU for the UP service. The NAS response message transmitted from the shared CP NF may include the SM response received from the non-shared CP NF.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented on a first network node, the method comprising:

receiving a session management (SM) message from a second network node, wherein the second network node is configured to implement a control plane (CP) Mobility Management (MM) function, wherein the first network node is configured to implement a CP SM function associated with a network slice, wherein the SM message indicates a request from a wireless transmit/receive unit (WTRU), and wherein the request from the WTRU is associated with establishment of a protocol data unit (PDU) session corresponding to the network slice; and sending an SM response message to the second network node, the SM response message being sent to the second network node for delivery to the WTRU, the SM response message indicating that the WTRU will be served by the network slice via the established PDU session.

2. The method of claim 1, wherein the SM response message is sent to the second network node for delivery to the WTRU in a non-access stratum (NAS) message.

3. The method of claim 1, wherein the SM message comprises a request to establish the PDU session, and the SM response message comprises a response indicating that the establishment of the PDU session has been accepted by the first network node.

4. The method of claim 1, wherein the SM response message indicates information associated with the network slice that is to be delivered to the WTRU.

5. The method of claim 1, wherein the SM message further includes an authentication token indicating that the WTRU is authenticated.

6. The method of claim 5, wherein the authentication token is generated based on identification information of the WTRU.

7. The method of claim 1, wherein the network slice is a dedicated network slice.

8. A first network node comprising a processor and a memory configured to:

receive a session management (SM) message from a second network node, wherein the second network node is configured to implement a control plane (CP) Mobility Management (MM) function, wherein the first network node is configured to implement a CP SM function associated with a network slice, wherein the SM message indicates a request from a wireless transmit/receive unit (WTRU), and wherein the request from the WTRU is associated with establishment of a protocol data unit (PDU) session corresponding to the network slice; and send a SM response message to the second network node, the SM response message being sent to the second network node for delivery to the WTRU, the SM response message indicating that the WTRU will be served by the network slice via the established PDU session.

9. The network node of claim 8, wherein the SM response message is sent to the second network node for delivery to the WTRU in a non-access stratum (NAS) message.

10. The network node of claim 8, wherein SM message comprises a request to establish the PDU session, and the SM response comprises a response indicating that the establishment of the PDU session has been accepted by the first network node.

11. The network node of claim 8, wherein the SM response message indicates information associated with the network slice that is to be delivered to the WTRU.

12. The network node of claim 8, wherein the SM message further includes an authentication token indicating that the WTRU is authenticated.

13. The network node of claim 12, wherein the authentication token is generated based on identification information of the WTRU.

14. The network node of claim 8, wherein the network slice is a dedicated network slice.

15. A wireless transmit/receive unit (WTRU) comprising a processor and a memory configured to:
    send a session management (SM) message to a second network node for forwarding to a first network node, wherein the second network node is configured to implement a control plane (CP) Mobility Management (MM) function, wherein the first network node is configured to implement a CP SM function associated with a network slice, wherein the SM message indicates a request from the WTRU, and wherein the request from the WTRU is associated with establishment of a protocol data unit (PDU) session corresponding to the network slice; and
    receive a SM response message from the first network node via a message received from the second network node, the SM response message indicating that the PDU session has been established for the WTRU for a user plane service associated with the network slice.

16. The WTRU of claim 15, wherein the SM message is in a first non-access stratum (NAS) message and the SM response message is in a second NAS message.

17. The WTRU of claim 15, wherein the WTRU is configured to utilize the user plane service association with the network slice via one or more user plane functions (UPFs).

18. The WTRU of claim 15, wherein the SM response message indicates information associated with the network slice that is to be delivered to the WTRU.

19. The WTRU of claim 15, wherein the SM message further includes an authentication token indicating that the WTRU is authenticated.

20. The WTRU of claim 15, wherein the network slice is a dedicated network slice.

* * * * *